US006330347B1

(12) United States Patent
Vajna

(10) Patent No.: US 6,330,347 B1
(45) Date of Patent: Dec. 11, 2001

(54) METHOD AND DEVICE FOR IDENTIFYING FINGERPRINTS USING AN ANALOG FLASH MEMORY

(75) Inventor: Zsolt Miklos Kovács Vajna, Bologna (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 09/123,956

(22) Filed: Jul. 28, 1998

Related U.S. Application Data

(63) Continuation-in-part of application No. 08/802,658, filed on Feb. 19, 1997, now Pat. No. 6,236,741.

(30) Foreign Application Priority Data

Jul. 29, 1997 (IT) .............................................. TO97A0680

(51) Int. Cl.[7] ...................................................... G06K 9/46

(52) U.S. Cl. ......................... 382/125; 382/215; 382/216; 382/304; 365/185.33

(58) Field of Search ..................................... 382/124–127, 382/193, 201, 195, 215–219, 260, 262–264, 266, 274, 296, 304; 356/71; 340/825.34, 5.53, 5.83; 365/185.33; 902/3, 6; 713/186

(56) References Cited

U.S. PATENT DOCUMENTS

| | | |
|---|---|---|
| 4,641,350 | 2/1987 | Bunn ......................................... 382/4 |
| 5,067,162 | 11/1991 | Driscoll, Jr. et al. ..................... 382/5 |
| 5,467,403 | * 11/1995 | Fishbine et al. ....................... 382/116 |

(List continued on next page.)

FOREIGN PATENT DOCUMENTS 0 343 580   11/1989   (EP) ................................ G07C/9/00

OTHER PUBLICATIONS

Kramer, A.H., Array–Based Analog Computation, IEEE micro, vol. 16, Issue 5, Oct. 1996, pp. 20–29.*
Asai, K. et al., "Automatic Fingerprint Identification," *Proceedings of the Society of Photo–Optical Instrumentation Engineers*, vol. 182, 1979, pp. 49–56.
Isenor, D.K. and S.G. Zaky, "Fingerprint Identification Using Graph Matching," *Pattern Recognition*, 19(2):113–122, 1986.
Elliott, *Parallel Processing: State of the Art Report*, Pergamon Infotech, Maidenhead, Berkshire, 1987, Chap I, "Automatic Fingerprint Recognition," (ed. C.r. Jesshoppe), pp. 3–17.

(List continued on next page.)

*Primary Examiner*—Leo Boudreau
*Assistant Examiner*—Brian P. Werner
(74) *Attorney, Agent, or Firm*—Lisa Jorgenson; Robert Iannucci; Seed IP Law Group, PLLC

(57) ABSTRACT

A method for identifying fingerprints includes the steps of acquiring a primary image and a secondary image; determining notable points in the primary image; comparing with one another the primary image and the secondary image in order to identify the correspondences between the primary image and the secondary image; and validating the possible correspondences. The comparison between the primary image and the secondary image is based on comparison of the regions which surround the notable points on the primary image, with all the points of the secondary image, through a flash cell array, such as to obtain lists of points in the secondary image which are probably associated with the notable points. The possible association is then verified, with acceptance of limited local deformations of the images on the basis of an associated graph, consisting of successive series of triangles, and the secondary image is considered to be identified when it has completed a final validation stage which is based on comparison of corresponding segments on the primary image and the secondary image.

25 Claims, 16 Drawing Sheets

U.S. PATENT DOCUMENTS

| | | | |
|---|---|---|---|
| 5,493,141 | 2/1996 | Ricco et al. | 257/321 |
| 5,493,621 | 2/1996 | Matsumura | 382/125 |
| 5,613,014 | 3/1997 | Eshera et al. | 382/124 |
| 5,640,200 * | 6/1997 | Michael | 348/87 |
| 5,659,626 | 8/1997 | Ort et al. | 382/125 |
| 5,761,330 * | 6/1998 | Stoianov et al. | 382/127 |
| 5,825,907 | 10/1998 | Russo | 382/124 |
| 5,841,888 | 11/1998 | Setlak et al. | 382/124 |
| 5,845,005 | 12/1998 | Setlak et al. | 382/124 |
| 5,982,913 * | 11/1999 | Brumbley et al. | 382/124 |

OTHER PUBLICATIONS

Fukue et al., "Fingerprint Verification System—Verification Algorithm," *IEEE Tencon '87*, Seoul, 1987, pp. 71–75.

Asai, K. et al., "Automatic Fingerprint Identification by Minutia–Network Feature–Matching Processes," *Transaction of the Institute of Electronics, Information and Communication Engineers D–II*, J72D–II(5):733–740, May 1989.

Yahagi, Hironori et al., "Moving–Window Algorithm for Fast Fingerprint Verification," *Southeastcon '90 Proceedings*, vol. 1, New Orleans, Louisiana, 1990, pp. 343–347.

Hung, D.C.D., "Enhancement and Feature Purification of Fingerprint Images, " *Pattern Recognition*, vol. 26, p. 1661–1671, 1993.

Kramer, A. et al., "Flash–Based Programmable Nonlinear Capacitor for Switched–Capacitor Implementations of Neural Networks," *IEDM*, 1994, pp. 343–347.

* cited by examiner

METHOD AND DEVICE FOR IDENTIFYING FINGERPRINTS USING AN ANALOG FLASH MEMORY

CROSS REFERENCE TO RELATED APPLICATION

This is a continuation-in-part of U.S. patent application Ser. No. 08/802,658 for "Method and Device for Indentifying Fingerprints" filed on Feb. 19, 1997 now U.S. Pat. No. 6,236,741.

TECHNICAL FIELD

The present invention relates to a method for identifying fingerprints using an analog flash memory.

BACKGROUND OF THE INVENTION

As is known, the fact that fingerprints are strictly personal and represent a type of identity card, gives rise to many applications. For example, fingerprints are used conventionally by the police for identification of criminal acts, and it has been proposed to use fingerprints as a type of personal key or signature to improve security of credit cards, to control access to security areas, to computers or to bank transaction systems. Fingerprints can also replace physical keys, which are often cumbersome, in order to obtain access to one's own dwelling or car.

The problem of full identification of fingerprints consists of defining a score to be allocated to a pair of images of fingerprints, which expresses the probability that the two prints belong to the same person. The two prints are acquired at two different moments. One usually belongs to a data bank which contains the reference to known persons, and the other must be validated or recognised by comparison with the first.

Conventional methods for identifying fingerprints, carried out manually by experts, comprise a plurality of classification steps. Recently automatic methods have been proposed, some of which comprise pre-classification steps which are similar to the conventional steps, and others which dispense completely with these stages, and, starting directly with the image of the print obtained provide the desired result, for example through a scanner or sensor, via an appropriate processor. The present invention relates to this second type of approach.

A fully automatic identification system is described for example in the article by K. Asai, Y. Kato, Y. Hoshino, K. Kiji "Automatic Fingerprint Identification," in Proceedings of the Society of Photo-Optical Instrumentation Engineers, vol. 182, Imaging applications for Automated Industrial Inspection and Assembly, pp. 49–56, 1979. According to this system, the notable points on the image (tips and branching of cutaneous crests, known as "minutiae") are determined directly by the image in tones of grey, and the correspondence of the prints is determined by taking into account by counting of the crests and taking into account the direction of the "minutiae," similarly to the manual method.

In D.K. Isenor, S. G. Zaky "Fingerprint Identification Using Graph Matching" Pattern Recognition, Vol. 19, No. 2, pp. 113–122, 1986, a method is described which is based on comparison between graphs. In the image of the fingerprint, the cutaneous crests and indentations are sought, and the former are numbered and oriented, whereas the latter represent the background. A level of adjacency is defined which expresses information concerning which crest is close to which other. On this graph abnormalities are identified and corrected which are associated with dirt or with interruptions of crests, associated with the acquisition system, in order to obtain the final graph which describes the fingerprint in coded form. The comparison between graphs makes it possible to determine the similarity between the fingerprints.

In K. Asai, Y. Hoshino, K. Kiji "Automated Fingerprint Identification by Minutia-network Feature-Matching Processes," Transaction of the Institute of Electronics, Information and Communication Engineers D-II, Vol. J72D-II, No. 5, pp. 733–740, May 1989 (in Japanese), use is made of a minutiae network which contains tip and branching points, and a corresponding link obtained by counting the cutaneous crests between notable adjacent points. There is also consideration of the local direction of the cutaneous crests. The pairs of corresponding points are obtained by transformation of coordinates and calculation of the similarity.

These systems have been assessed on a few hundred proprietary fingerprints, and do not yet permit identification with the accuracy required for police uses, where there are many millions of images to be compared.

In addition, in European patent application 96830080.6 filed on Feb. 2, 1996 in the name of SGS-Thomson Microelectronics, S.r.l., a method of identification is described which is based on the search for characteristic points on the reference image and on the image to be recognised, and on comparison between regions which surround the characteristic points of the two images, on the basis of the integral norm for these regions, carried out through an analog flash memory. This method is applicable in practice in acceptable times, and has provided excellent results concerning the number of incorrect identifications, but the percentage of correct recognition is too low for practical applications. This low level of correct recognition can be attributed to the high deformation which exists between different images of a single print, owing to the possibility of rotations of the print which can be greater than 20°, and to the differences in quality of the images, owing to considerable variation of the ink (in excess or lacking). Furthermore, the use of non-linear filtering in the field of frequencies of the images, in order to improve the quality of the image, has led to improvement of the percentage of correct identifications, but is not yet sufficient, and gives rise to a substantial increase in the costs from the point of view of the calculation time.

SUMMARY OF THE INVENTION

An object of the invention is thus to provide a method of identification, which can increase the level of correct identifications, with a calculation time which is acceptable for the applications planned.

The present invention provides a method for identifying fingerprints, using an analog flash memory. The method according to one embodiment of the invention includes acquiring a primary image having a plurality of primary points, and a secondary image having a plurality of secondary points, the primary and secondary points being characterised by a quantity associated with the three-dimensional structure of prints to be identified. The method determines notable points among the plurality of primary points; compares the primary image and secondary image; identifies possible correspondences between the primary image and the secondary image; and validates the possible correspondences. The comparison includes determining scanning regions of the secondary image, which surround the secondary points, and comprise the entire secondary image; and compares notable regions of the primary image which surround the notable points, with the scanning regions, using flash memory cells.

DETAILED DESCRIPTION OF THE INVENTION

The invention will now be described with reference to the attached drawings, which illustrate a non-limiting embodiment.

Figure 1:
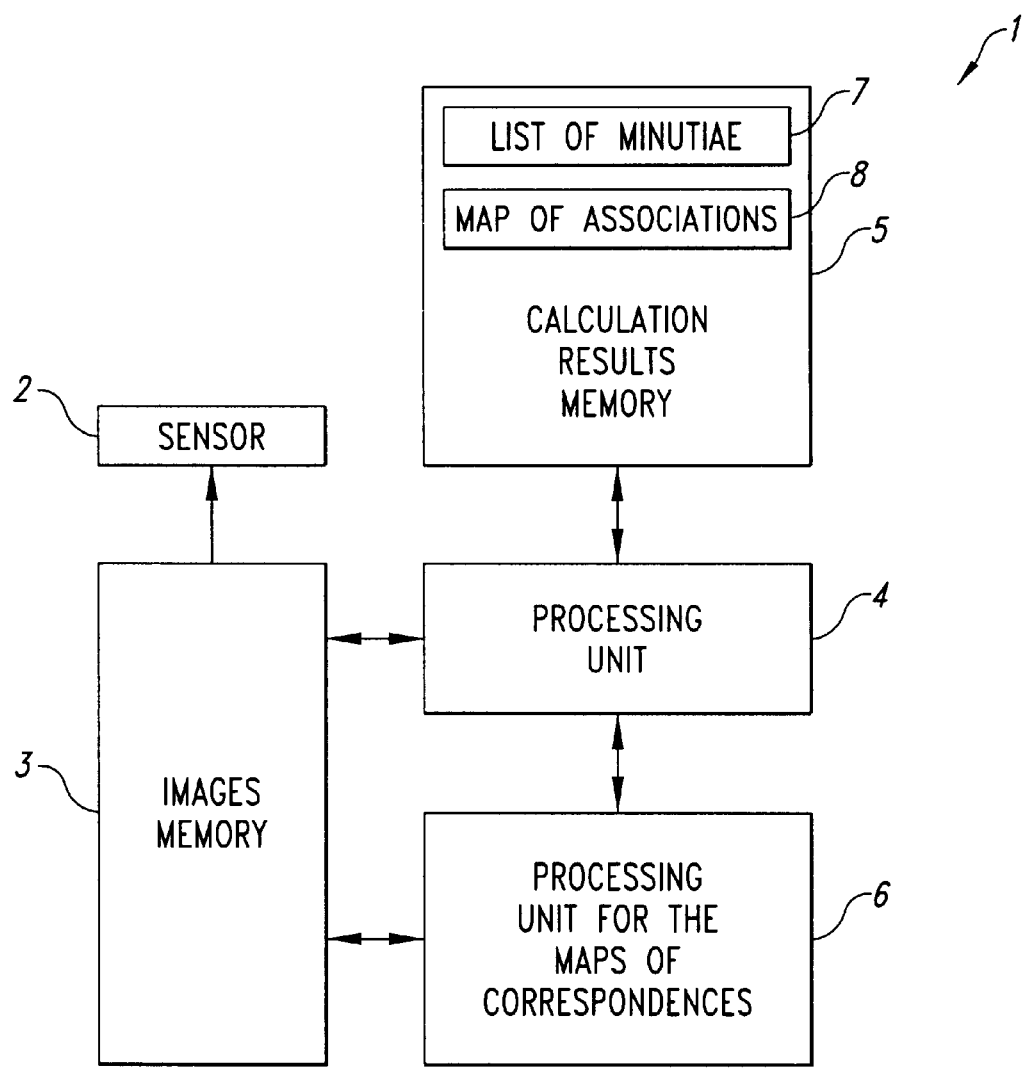
FIG. 1 shows a block diagram of a device for identifying fingerprints, which implements a method according to the invention.

In FIG. 1, a device 1 for identifying prints generally comprises a sensor 2 for acquisition of fingerprint images, as matrices of points which are characterised by different levels of grey; an images memory 3 which is connected to the sensor 2; a processing unit 4, which is connected bidirectionally to the images memory 3; a calculation results memory 5, which is connected bidirectionally to the processing unit 4 for storage, inter alia, of a list of minutiae 7 and of association maps 8; and a correspondence map extraction unit 6, which is connected bidirectionally to the processing unit 4, and unidirectionally to the images memory 3, for execution of predetermined steps of the method of identification, as described in greater detail hereinafter.

The sensor 2 is a scanner which operates in accordance with any known principle, for example optical, capacitive, piezoelectric, ultrasound, thermal, although the capacitive sensor described in U.S. patent application Ser. No. 08/799,548, assigned to SGS-Thomson Microelectronics, S.r.l., is preferably used. The purpose of the sensor 2 is to provide images of a reference print (hereinafter known as the primary image), and of a print to be identified (hereinafter known as the secondary image), formed for example from 200×200 pixels, each characterised by different levels of grey, variable between 0 and 255.

The images memory 3 is preferably subdivided into various regions for storage on each individual occasion, and according to the processing step, of the primary image as acquired, of the secondary image as acquired, of images derived from processing of acquired images, as well as of portions of the latter, as described hereinafter. It will be appreciated that in the event of a request for identification of a secondary print from among a plurality of reference images, the portions relating to the primary image are duplicated for each further reference image.

The processing unit 4 carries out the processing required, controls the flow of data from and to the memories 3, 5, and controls the correspondence map extraction unit 6, as described hereinafter with reference to FIGS. 2a and 2b, relative to the main steps of an embodiment of the present invention.

Figure 2A:
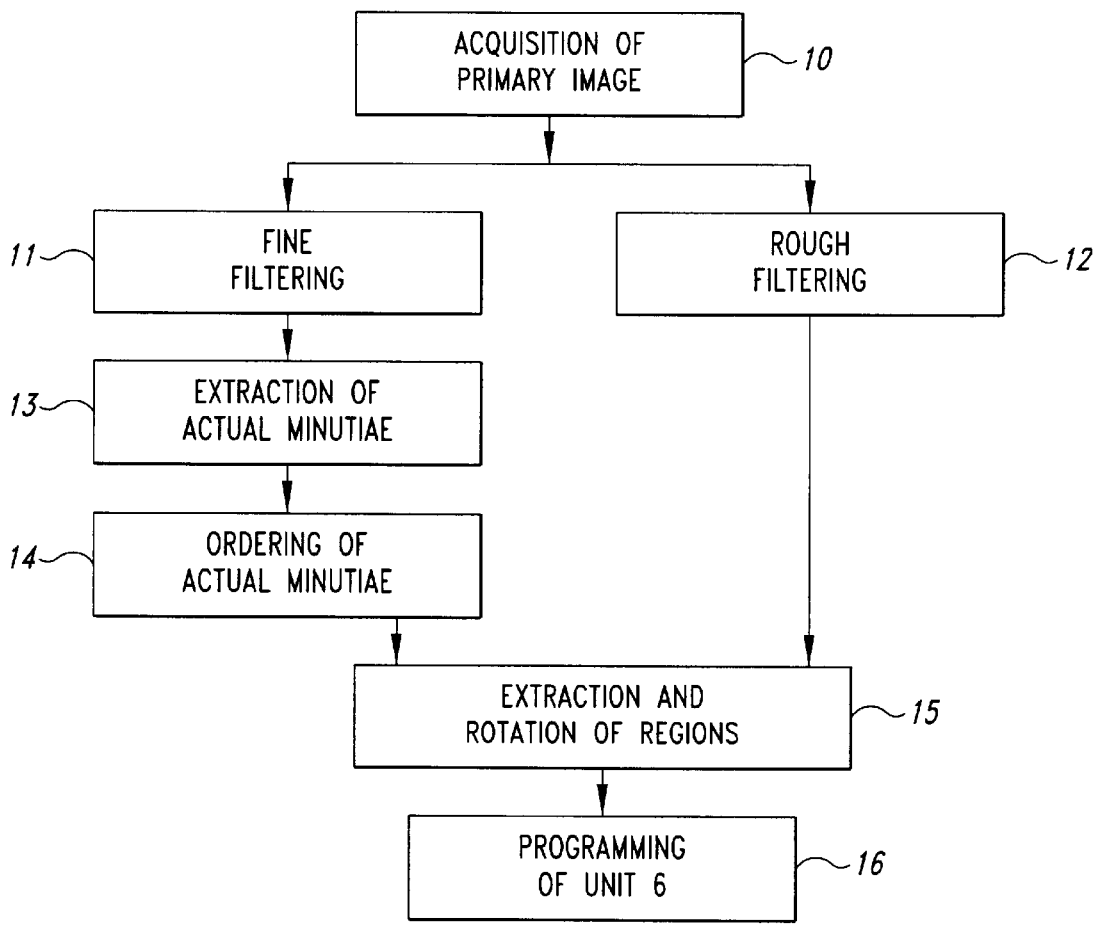
FIGS. 2a, 2b, 3–6 show flow charts relating to steps of the present method.
Figure 2B:
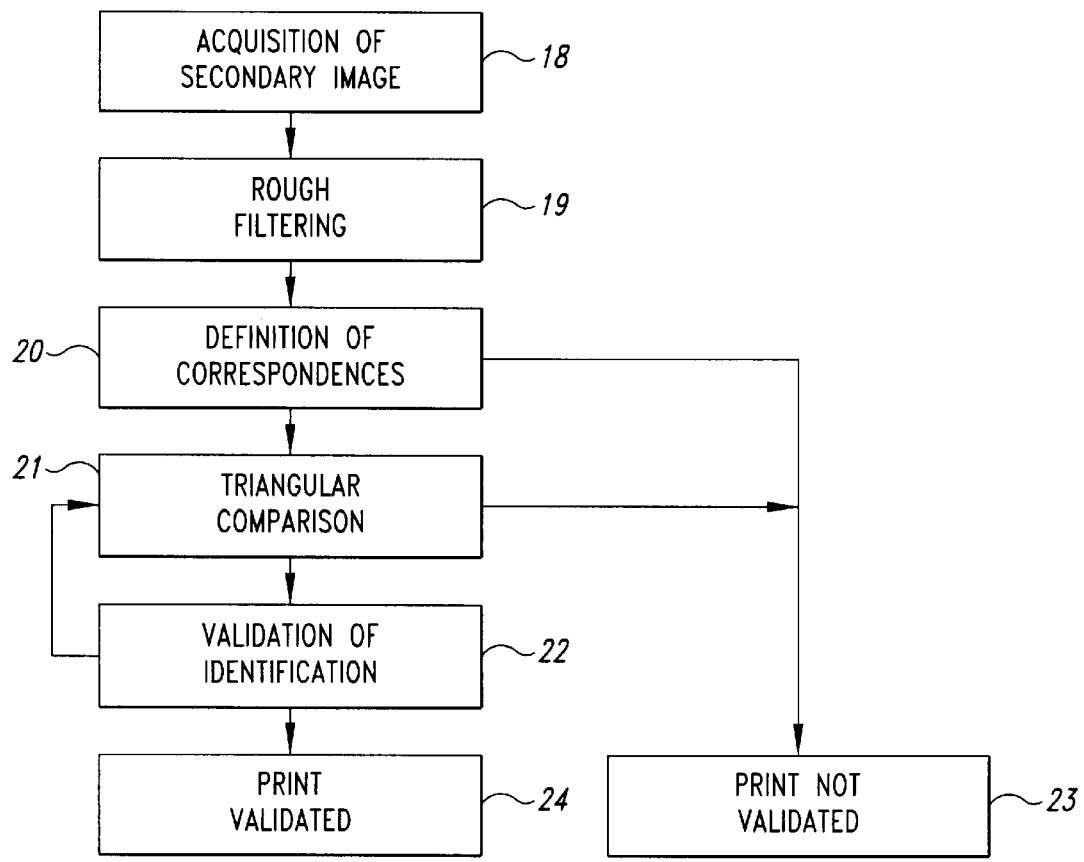

The present method includes preliminary processing of the primary image and storage of the results (learning step), as shown in FIG. 2a, and subsequent processing of the image to be recognised, using the results acquired from the preliminary processing of the reference image (recognition step), as shown in FIG. 2b. Thereby it is possible to carry out the processing which is the most onerous from the point of view of calculation time, once only and preliminarily, and then to speed up the operations necessary for comparison with an image to be recognised.

With reference to FIG. 2a, the learning step begins, block 10, with acquisition of the primary image and storage of the latter in the images memory 3. The primary image as acquired is then filtered finely, for example, through non-linear filtering in the field of Fourier two-dimensional transformation, as described in G. T. Candela, P. J. Grother, C. I. Watson, R. A. Wilkinson, C. L. Wilson, PCASYS, "A Pattern-Level Classification Automation System for Fingerprints," August 1995 (block 11). The purpose of this fine filtering operation is to eliminate spurious interruptions of the crests and knurls present on the edge of the cutaneous crests owing to the diffusion of the ink on the paper (in the case of acquisition of the image by inking the finger and pressing the inked finger on the paper). The finely filtered primary image is then temporarily stored in the images memory 3.

Figure 3:
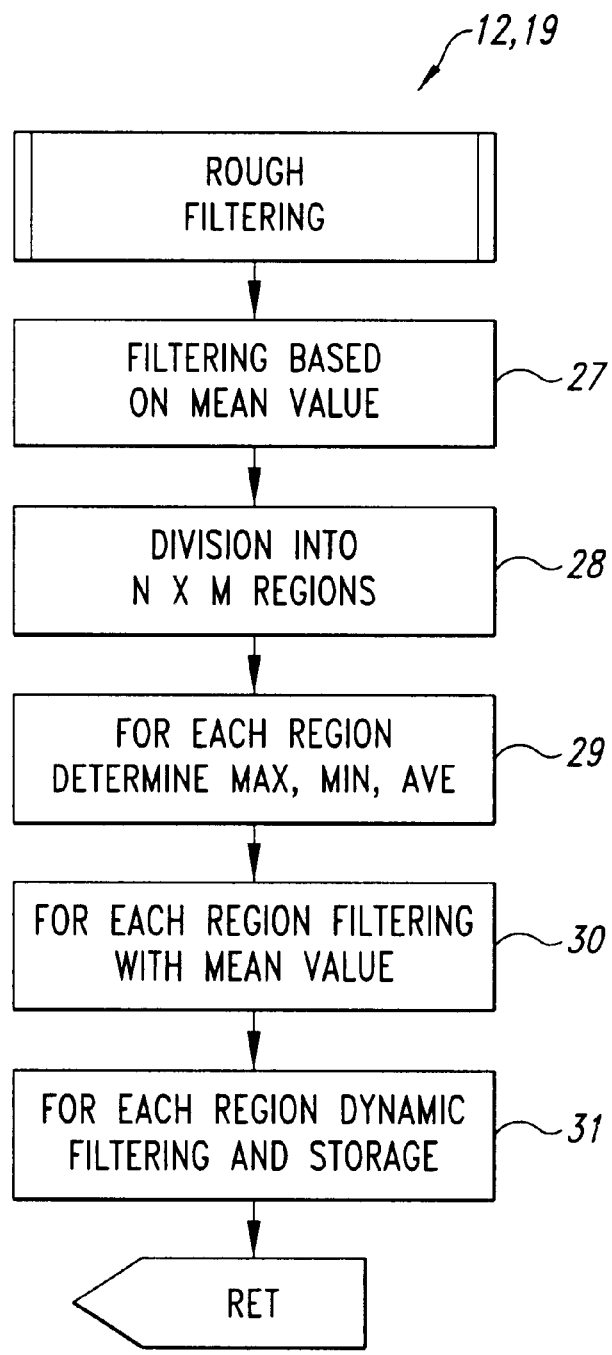

Simultaneously (in the case of multi-processor processing units or a dedicated fine filtering unit), or after the fine filtering, rough filtering of the primary image is carried out, block 12. The object of this operation, which is described in greater detail hereinafter with reference to FIG. 3, is to improve the quality of the primary image, not from the point of view of frequency or noise, but from the point of view of the dynamics of the tones of grey. In fact, for a variety of reasons (contrast or brightness of the scanner, lack of uniformity of the ink, worn crests, etc.) the image acquired often does not cover the entire dynamics of the tones of grey (256 in this case). Consequently when comparison takes place of the primary image and the secondary image, of which for example one is highly contrasted and the other is not, there is the problem of equalising the amplitude of the signal, i.e., the excursion of the tones of grey, a problem which is solved through the rough filtering. The roughly filtered primary image is then stored in the images memory 3.

After the fine filtering according to block 11 (before or after the rough filtering), a step of extraction of actual minutiae from the finely filtered primary image is carried out, block 13. The object of this step is to identify the minutiae (branching and tips of cutaneous crests), and it is carried out for example as described in the aforementioned article by Asai, Kato, Hoshino, Kiji "Automatic Fingerprint Identification". On completion, the coordinates are obtained of 60–70 points which are useful for the purpose of comparison (with a high percentage corresponding to physical minutiae). The coordinates of the actual minutiae thus obtained are then stored in the calculation results memory 5.

In order to reduce the subsequent calculation time, during the recognition step, there are extracted the proximity links between the actual minutiae, ordered according to distance, with storage in the images memory 3 of the development of the tones of grey of the intermediate pixels between two actual adjacent minutiae (block 14), as described in detail with reference to FIG. 5.

Subsequently, after determination of the actual minutiae and rough filtering of the primary image, a step is carried out of extraction of notable regions which surround the actual minutiae, and rotation of these regions (block 15). In practice, from the roughly filtered primary image, there are extracted regions of predetermined dimensions, centred on the actual minutiae determined, and these regions are pre-rotated such as to reduce the error in subsequent comparison with the secondary image, and to reduce the time of processing of the recognition step. The value of the pixels of the notable pre-rotated regions is then used to program a flash memory array (not shown in FIG. 1, and belonging to the correspondence map extraction unit), block 16, as described hereinafter in detail. On completion of the learning step, in the images memory 3, there are then present only the lines joining the actual minutiae previously determined, whereas in the results memory 5 there is present the list 7 of the actual minutiae, which includes the proximity links.

In simulations carried out by the inventor, with the exception of programming 16, the learning step described required 10 to 400 seconds, but this step is carried out once only on the primary image, when the latter is being defined, and this therefore does not affect the subsequent processing time, which is preferably as fast as possible.

With reference to FIG. 2b, the recognition step begins with acquisition and storage of the secondary image to be identified, in the images memory 3, block 18.

Subsequently, in block 19, the secondary image is filtered roughly in the same way as the primary image, and is stored once again in the images memory 3. This operation requires approximately half a second on a 140 MIPS machine.

Subsequently in block 20, the regions which surround all the pixels of the secondary image filtered are compared with the notable pre-rotated regions previously stored, in order to determine their similarity; on the basis of the similarity value encountered, there are determined and ordered in terms of distance the possible correspondences between each actual minutia of the primary image, and the points of the secondary image, and the possible correspondences are stored in the association maps 8, as described in greater detail with reference to FIG. 7. This operation (known as definition of correspondences) can be concluded positively when sufficient association maps 8 are determined, and each map comprises a sufficient number of associations, in which case stored the association maps are used for subsequent processing, or the operation can be concluded negatively, in which case the processing ends with indication of failure to recognise the print (block 23). The step of definition of the correspondences 20 is very onerous from the point of view of computing, but it can be carried out with an analog chip based on flash memories, as described hereinafter with reference to FIGS. 11–13.

When the association maps are available, plausible correspondences are sought between the actual minutiae, taking into account the deformation which exists between the images. There is then carried out a triangular comparison (block 21) which is described in greater detail with reference to FIG. 8. This comparison step can end positively, in which a final step of validation is carried out, as required by the method of identification defined by the legislative system (block 22), or it can end negatively, in which case there is progress to block 23. The validation step 22 can also end positively, such that a signal for a validated print is generated (block 24), or it can end negatively (in which case there is a return to block 21).

The entire step of recognition according to FIG. 2b can be carried out using only algorithms which are based on whole, 32 bit numbers, without ever resorting to operations or variables with a mobile decimal point. Apart from the step of definition of correspondences 20, the average processing time for execution of the recognition step is 1 s on a 140 MIPS computer.

With reference to FIG. 3, the step of rough filtering 12 (for the primary image) or 19 (for the secondary image) initially comprises a filtering step based on the mean value of the entire image (primary or secondary), in order to reduce the local variations of the tones of grey, block 27. This step consists of replacing the value of each pixel by the value obtained by weighting the pixel itself and the pixels adjacent to it, adding the weighted values obtained, and normalising the sum obtained, in a manner which is known, and is thus not described in detail.

Subsequently the image is subdivided into a plurality of m×n regions, block 28. In each region there is determined the maximum value max, the minimum value min, and the mean value ave of the tones of grey of the pixels, block 29. Each region is filtered once more with a filter based on the mean value, similarly to the above-described process, block 30. Thereby, it is attempted to eliminate erroneous interruptions of the lines, in order to reveal the continuous development of the maximum, the minimum, and the mean value of the tones of grey.

Finally, a step of dynamic filtering is carried out, on the basis of which the value p of each pixel of each region is replaced by a value $p_r$ defined as follows:

$$p_r = \begin{cases} p > ave = \dfrac{p - ave}{\max - ave} \times cost + cost \\ p \leq ave = \dfrac{ave - p}{ave - \min} \times cost \end{cases}$$

in which cost is half the maximum excursion of the tones of grey (128 in the case of 8 bits). The new values $p_r$ of the pixel are then stored as a roughly filtered image (block 31).

Figure 4:
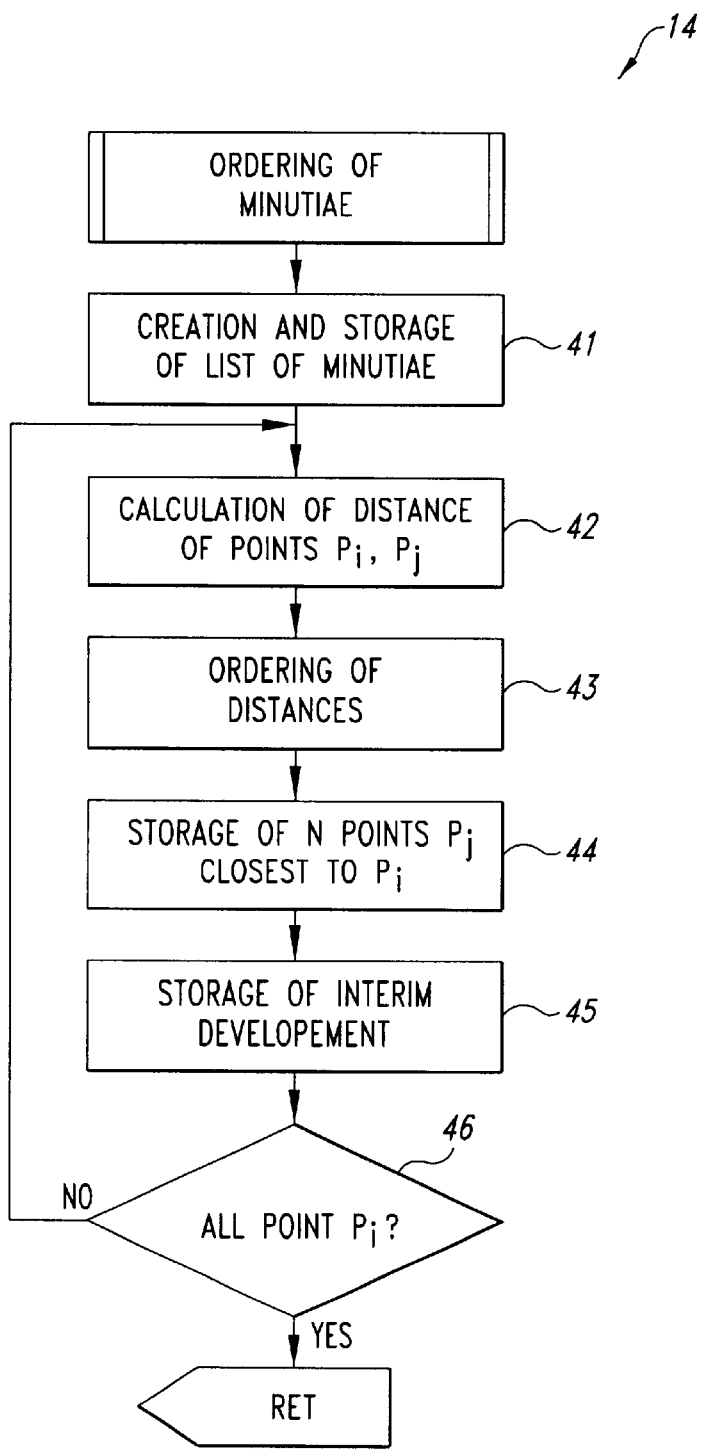

With reference to FIG. 4, the step of ordering of the actual minutiae 14, block 41, initially comprises ordering of the actual minutiae previously determined in list ordered according to increasing distance from the centre of the image, and storage of the list thus generated in the results memory 5 (as the minutiae list 7). Then, for each point $P_i$ in the list, there is calculated the distance from the other points $P_j$ in the list (block 42); the points $P_j$ which are close to $P_i$ are ordered by increasing distances, block 43; of these, N points are taken (for example 20 points) of the closest $P_j$s, and these are stored, block 44. Then, in the images memory 3, there is stored the development of the tones of grey of the pixels of the roughly filtered reference image, which are disposed on the line adjacent to each point (actual minutiae) $P_i$, and the N nearby $P_j$s determined in step 44, or there is stored the development of the crests which intersect these lines, or are close to these lines, as described in greater detail with reference to FIG. 10, block 45. The step of ordering of the minutiae ends when the ratios of vicinity of all the actual minutiae have been determined (YES output from block 46).

Figure 5:
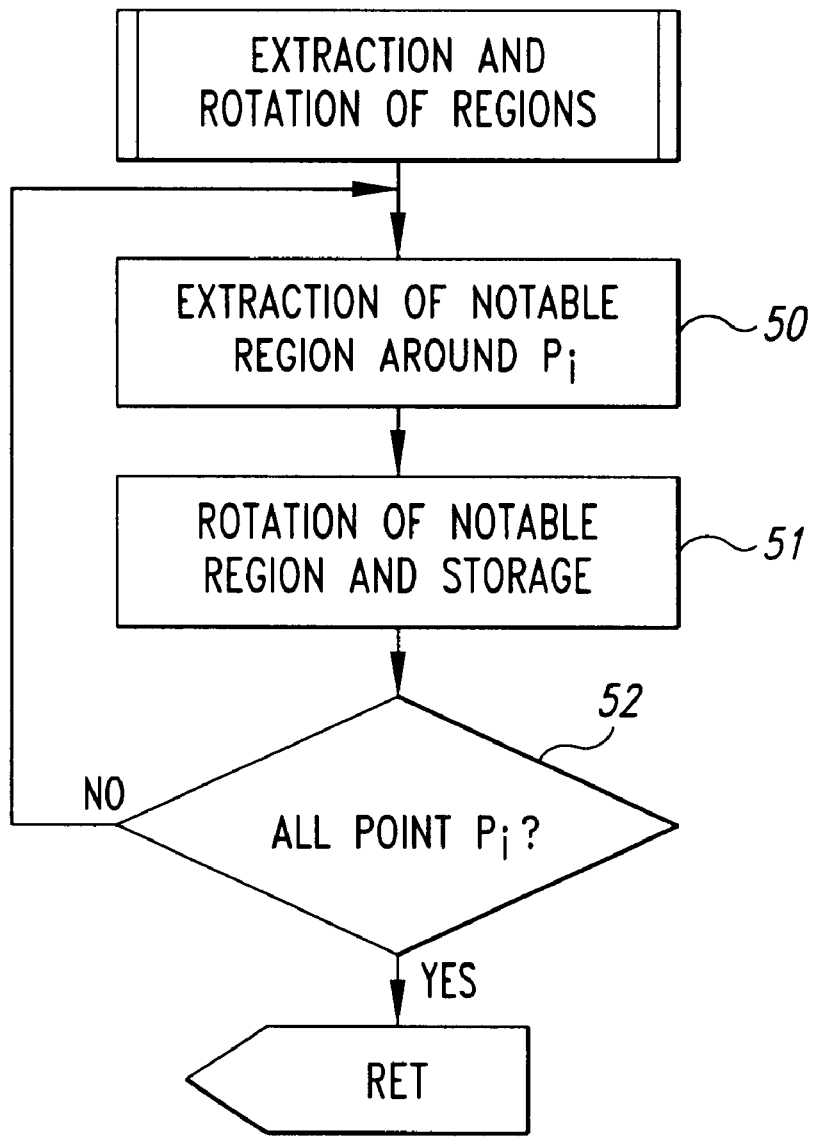

With reference to FIG. 5, the step of extraction and rotation of the regions 15 initially comprises extraction of a region (e g., 16×16 pixels) around each actual minutia $P_i$, block 50; rotation into N1 different positions which are symmetrical relative to the position of acquisition, and storage of the N1+1 regions thus obtained (taking into consideration also the region with zero rotation) in the images memory 3, block 51. In particular, a study carried out by the inventor has shown that in the case of rotation of up to 2.5°, a normalized difference (between the non-rotated image and the rotated image) of a maximum of 2% is obtained. In addition, it has been noted that the images to be recognised can be rotated up to 20°, to which there corresponds a difference between regions of 25%. This difference is extremely large, and would require such a wide threshold that it would not be possible to determine sufficiently accurately the similarity of the regions. This problem is solved by storing for example seven regions which are rotated relative to the roughly filtered image, by −15, −10, −5,0, 5, 10 and 15 degrees. Thereby, the intrinsic error between the image to be recognised and the image rotated by the minimum distance, remains lower than 2%, in the case of an image to be recognised which is rotated by a maximum of 17.5°, and becomes only 7% for rotations of 20%, making it possible to use reasonable thresholds in the comparison between regions, as described hereinafter with reference to the step of definition of correspondences 20.

The step of extraction and rotation of regions 15 ends after determination and storage of the regions rotated, for all the actual minutiae (YES output from block 52).

Figure 6A:
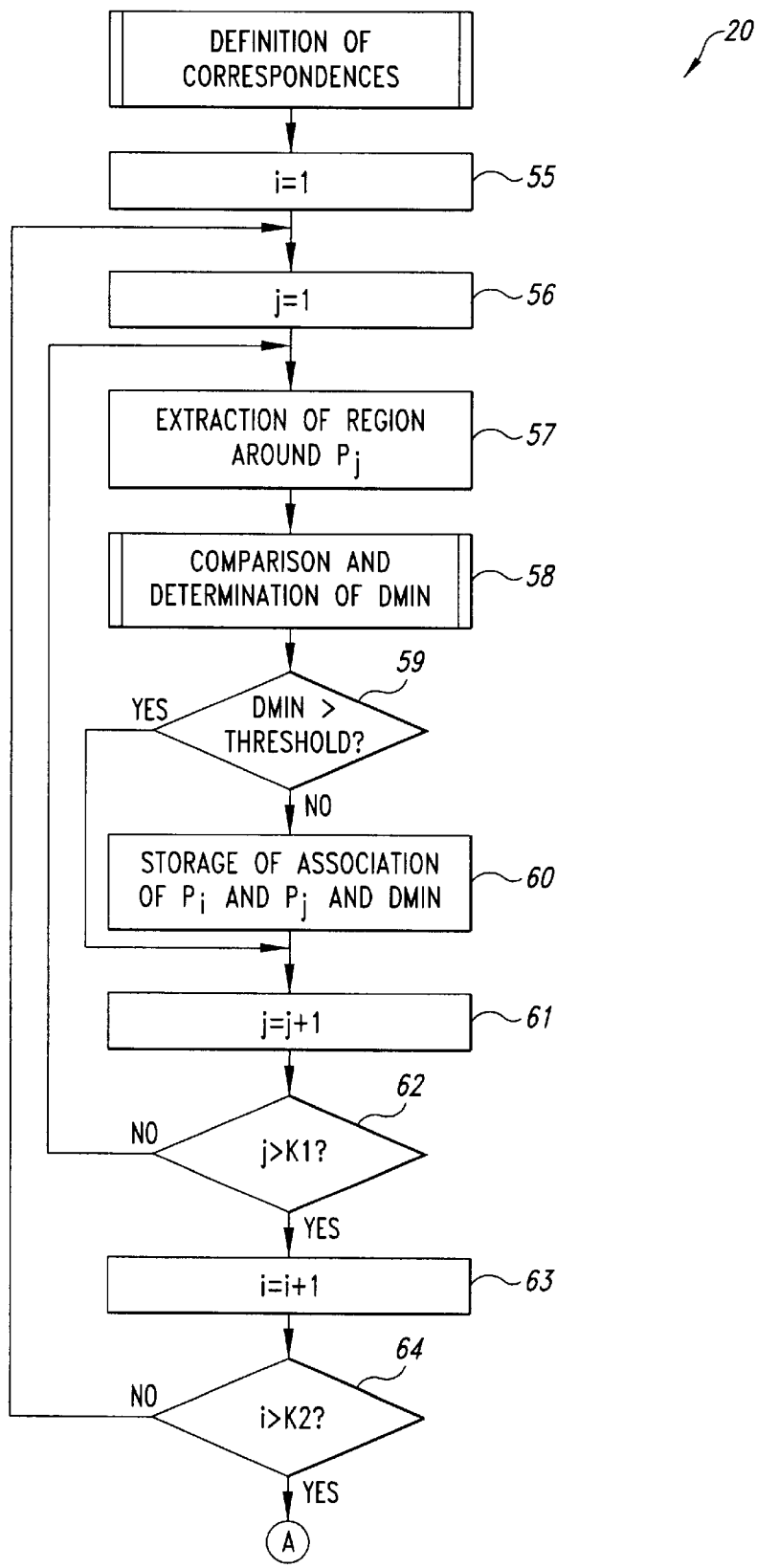
Figure 6B:
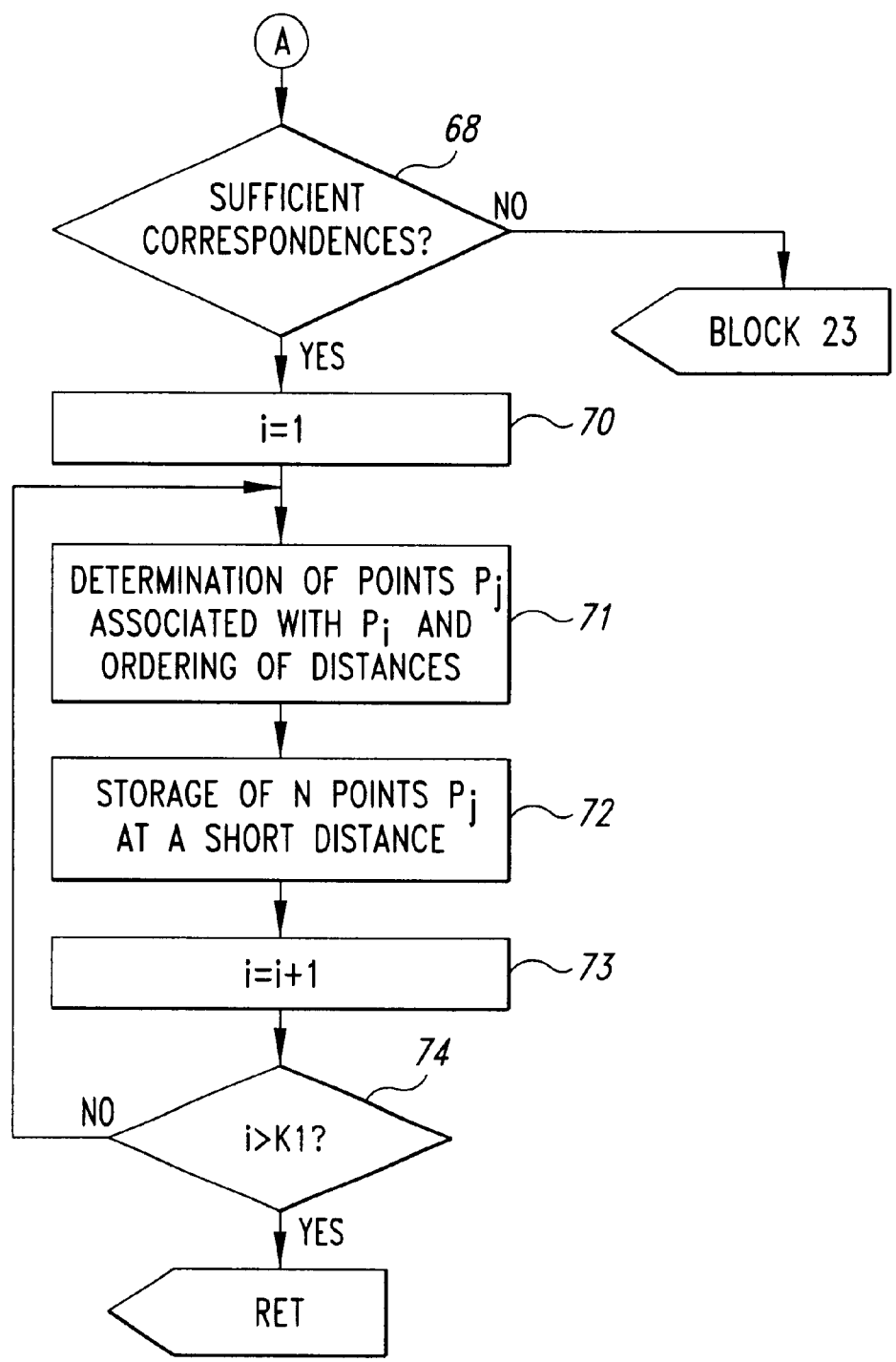

With reference to FIG. 6, the step of definition of correspondences 20 comprises a sequence of initial steps in order to identify, for each point $P_j$ of the roughly filtered secondary image, the one from among the notable pre-rotated regions stored and associated with each minutia $P_i$, which has the greatest similarity, and then a subsequent sequence of steps in order to determine and order, on the basis of the similarity values encountered, the points $P_j$ on the secondary image which most probably correspond to the minutia $P_i$ considered.

The step of definition of correspondences 20 then initially comprises the initialisation of a counter i (block 55) and a counter j (block 56) relative respectively to the actual minutiae identified on the primary image, and to the points of the roughly filtered reference image. Then, from the roughly filtered secondary image, there is extracted a region which surrounds the point $P_j$, with dimensions identical to those of the regions pre-rotated and stored from the primary image (16×16 pixels in the case in question), block 57. As soon as it is extracted, the image is then compared with all the notable, pre-rotated images associated with the point $P_i$; the distance is calculated from each of these, and there is identified the notable image at the minimum distance, block 58, as described in greater detail hereinafter with reference to FIGS. 11–13. The minimum distance thus identified is compared with a maximum acceptable distance threshold, block 59; if the distance is lower than this threshold (NO output from block 59), the association between the point $P_j$ and the minutia $P_i$ is stored, and the distance identified, block 60. Then, and also in the case when the minimum distance determined is greater than the planned threshold (YES output from block 59), the index j is incremented, block 61, it is verified that all the points of the secondary image have not already been examined, in which case (NO output from block 62) the processing is repeated according to steps 57–61. Otherwise (YES output from block 62), the comparison is repeated once more for all the points of the secondary image for a new minutia $P_j$, incrementing the index i (block 63) and checking that all the actual minutiae present have not already been examined (NO output from block 64).

On completion of the sequence of initial steps (YES output from block 64) it is verified whether sufficient correspondences have been found for at least a pre-determined minimum number of minutiae, block 68. If this is not the case (NO output), processing of the secondary image ends, with progress to block 23 in FIG. 2b; otherwise (YES output) there is progress to the subsequent sequence of steps, with re-initialisation of the counter i (block 70), with determination, on the basis of the correspondences previously stored, of the correspondence of points $P_j$ of the secondary image with the minutia $P_i$, and ordering of these points according to increasing distance, block 71. From the points $P_j$ thus ordered, there are taken N (for example 12) at a smaller distance, and these are stored in the association maps 8 of the results memory 5 (FIG. 1), block 72. The steps 70–71 are repeated for all the actual minutiae stored, incrementing the counter i (block 73). The step of definition of correspondences 20 ends after the association of all the actual minutiae, with the corresponding points with the greatest similarity in the secondary image (YES output from block 74).

The step of triangular comparison is associated with the need to determine a model of the non-linear deformation to which the prints are subject. In particular, by analysing the primary image and the secondary image, it is noted that according to the rotation of the finger, there can be a strongly variable difference between the minutiae themselves. However, when a small portion of the image is observed, this deformation is not at all obvious. Consequently, an algorithm has been produced which makes it possible to take into consideration large scale deformations, but which limits those on a small scale. In particular, this algorithm is based on the following idea.

Figure 7A:
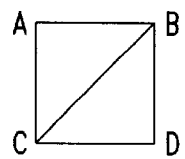
FIGS. 7a–7e illustrate conceptually how to take into account high global deformations of images, using a criterion of low local deformation.
Figure 7B:
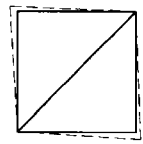
Figure 7C:
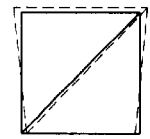
Figure 7D:
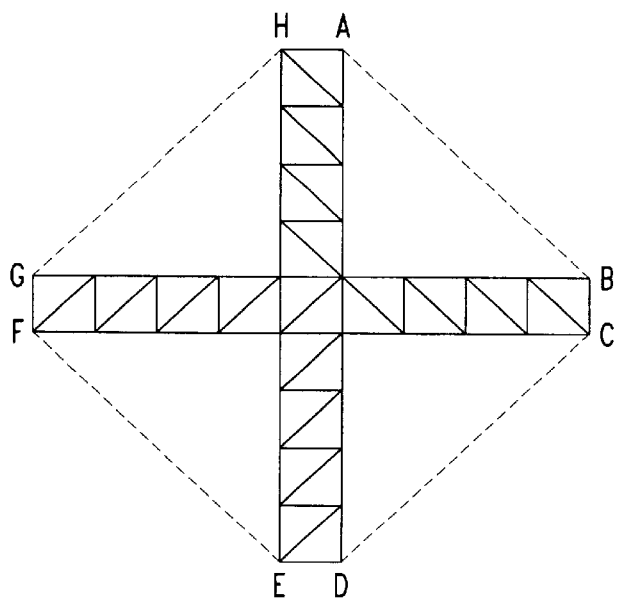
Figure 7E:
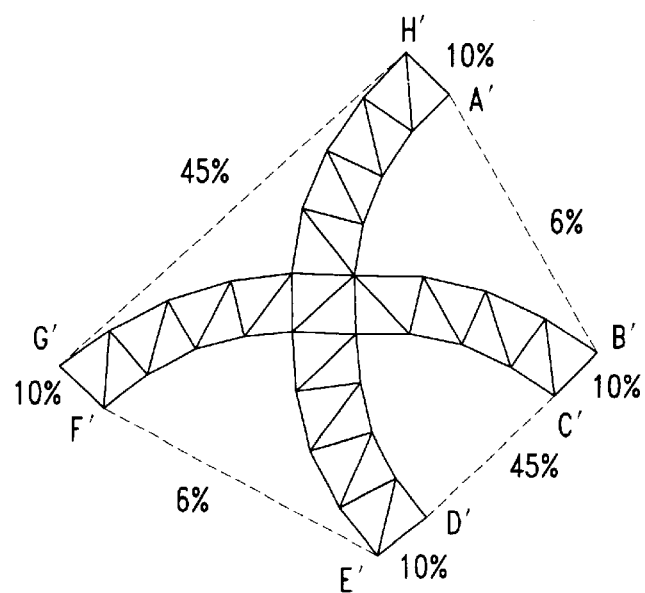

It is assumed that there is a pair of triangles which form a square ABCD, as shown in FIG. 7a. By lengthening or shortening slightly the sides of these triangles by at least 10% of the original length, it is possible to obtain for example the two quadrilaterals shown with a broken line in FIGS. 7b and 7c. By repeating the square ABCD in FIG. 7a, it is possible to obtain the cross shown in FIG. 7d. If it is assumed that each square of the cross is deformed as shown in FIG. 7b, the distorted cross in FIG. 7e is obtained. In the distorted cross, the segment AB is transformed into the segment A'B' which is shorter by 6%, whereas the segment CD is transformed into the segment C'D' the length of which is 45% shorter than CD. This example illustrates the idea of the deformation model which presupposes a small deformation locally, whereas globally, it makes it possible to take into account also significant alterations.

Figure 8A:
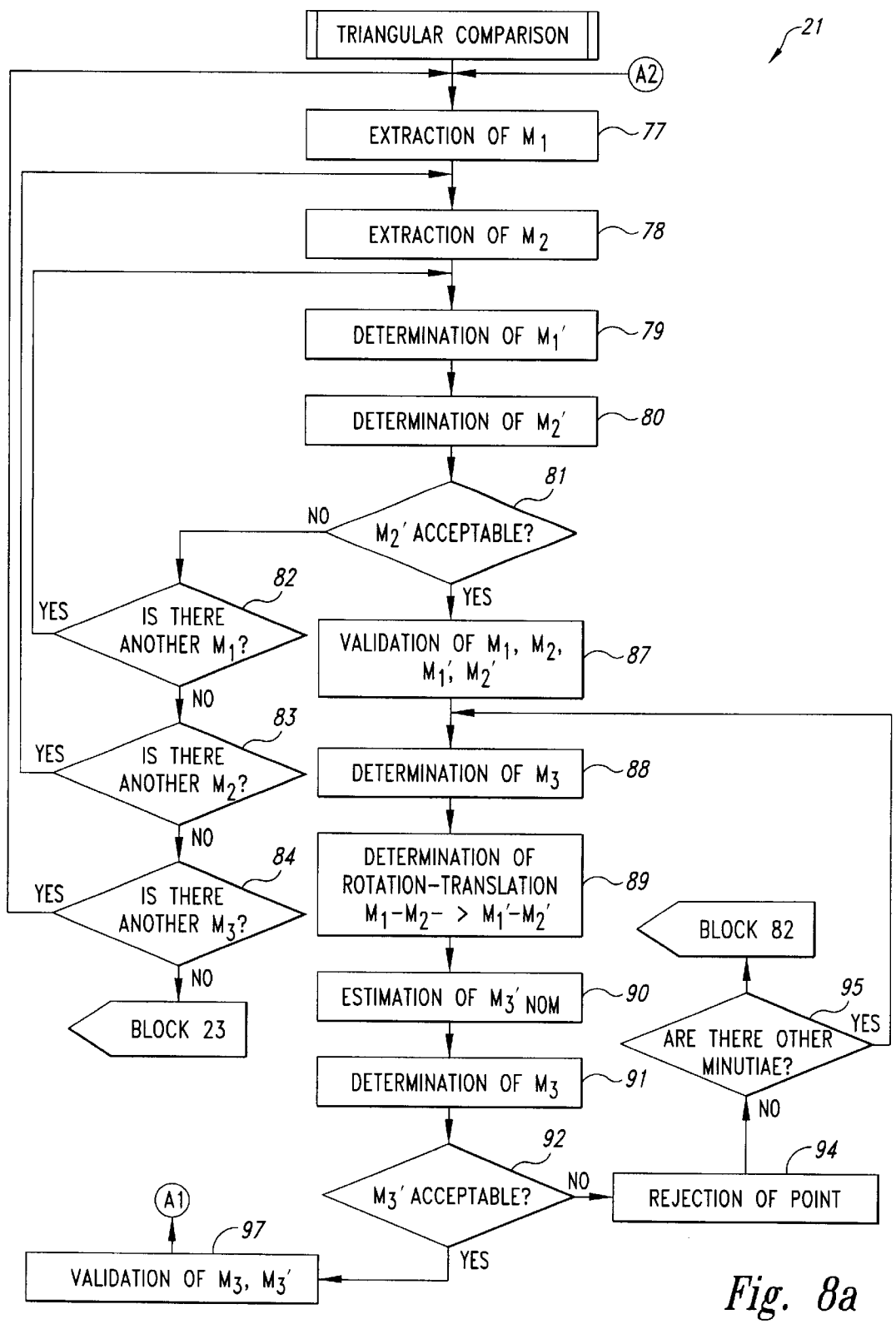
FIGS. 8a, 8b, 9 and 10 show flow charts relating to subsequent steps of the present method.
Figure 8B:
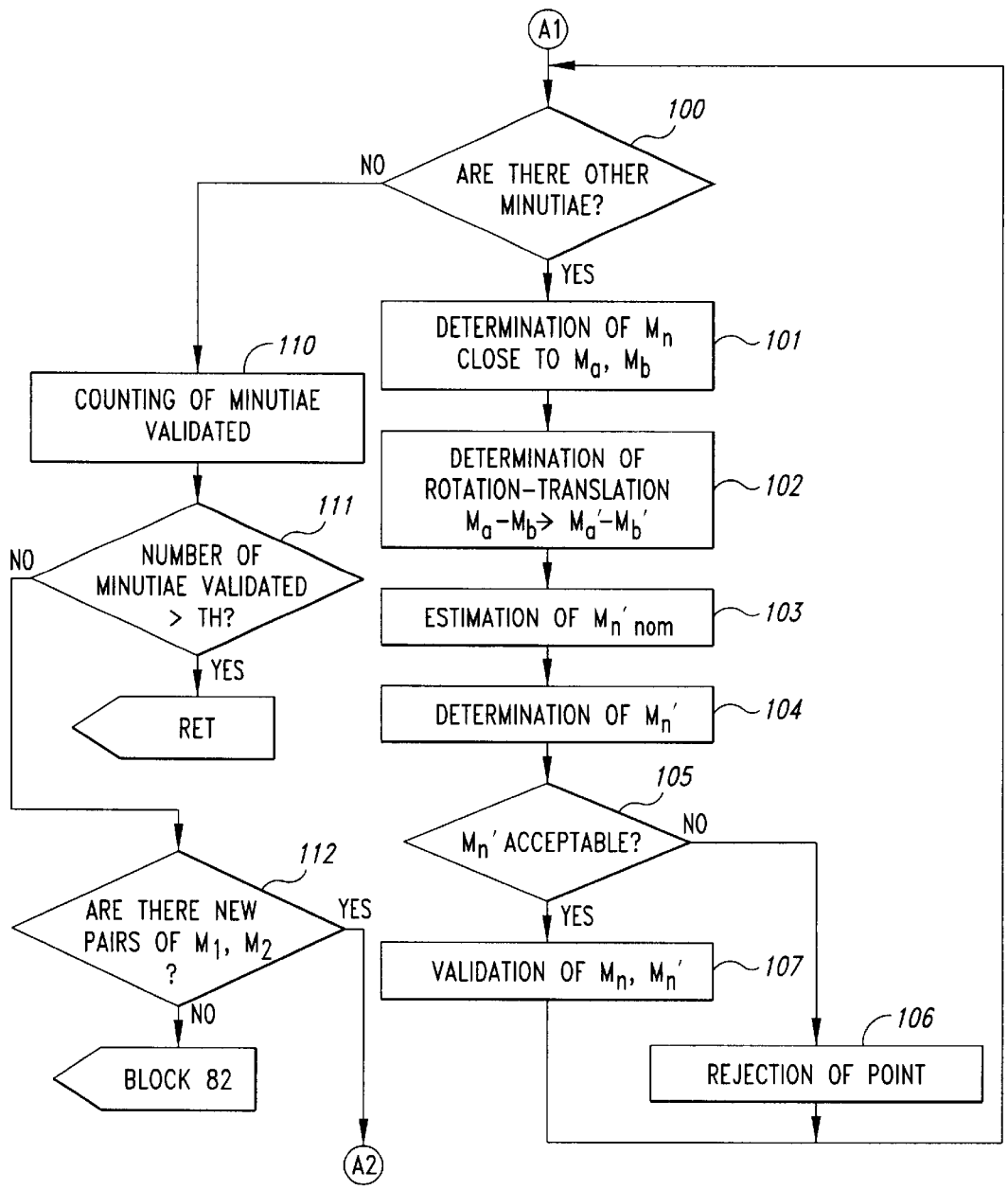

On the basis of the idea illustrated above, an algorithm has been produced which is based on gradual creation of an associated graph on the primary image and the secondary image. Consequently, as shown in FIG. 8a, the step of triangular comparison 21 initially comprises extraction of a first minutia $M_1$, block 77. This extraction consists substantially of reading the coordinates from the corresponding map and of marking the latter (in a corresponding associated field), making it possible to identify this as a minutia already considered. Then, similarly, a minutia $M_2$ is extracted which is close to $M_1$, block 78, and a point $M_1'$ is determined on the reference image, from among those associated with the minutia $M_1$, and determined in the step of definition of correspondences 20, block 79. A point $M_2'$ is selected on the secondary image from among those associated with the minutia $M_2$, such that the difference in length of the segments $M_1$–$M_2$ and $M_1'$–$M_2'$ is no greater in absolute value than a predetermined threshold value (for example 6 pixels, or 10% of the average length of the segments), block 80. If, from among all the points $M_2'$ associated with $M_2$, a point $M_2'$ is not identified which satisfies the length condition indicated, NO output from block 81, it is verified whether there is at least one other point $M_1'$ associated with $M_1$ which has not yet been considered. If this is the case (YES output from block 82), this other point $M_1'$ is acquired, and there is a return to block 79, otherwise, it is verified whether there is at least one other minutia $M_2$ close to $M_1$. If there is another close minutia (YES output from block 83), the new minutia $M_2$ is acquired, the previous minutia $M_2$ is marked rejected, and there is a return to block 78, otherwise it is verified if there is at least one other minutia $M_1$ from among those not examined. If there is another minutia $M_1$ (YES output from block 84), the latter is acquired, the previous minutia $M_1$ is marked rejected, and there is a return to block 77, otherwise the print is considered to be non-identified, and there is progress to block 23.

Once there has been determination of the pair of points (minutiae) $M_1$, $M_2$, and the correlated pair $M_1'$, $M_2'$ (YES output from block 81), these pairs are marked as validated (block 87) and a subsequent point $M_3$ is sought. In detail, block 88, from among the actual minutiae not yet considered in the association map 8, the minutia $M_3$ which is closest to $M_1$ and $M_2$ is determined. In particular, the minutia is sought which minimises the MAX function $[L(M_1M_2), L(M_1M_3)]$, in which MAX[] is the maximum value between two real numbers, and L() is the distance (euclidean norm) between two points on the two-dimensional Cartesian plane.

Subsequently, in block 89, the pairs of points $M_1$–$M_2$ and $M_1'$–$M_2'$ are used to identify a linear transformation of rotation-translation and homothety (which therefore also takes into account a slight variation of dimension) between the primary and the secondary image. On the basis of the linear transformation identified, and using the coordinates of $M_3$, there is calculated the ideal coordinate in which the minutia which corresponds to $M_3$ should be located on the secondary image (estimate of $M_{3'nom}$, block 90), and from among the minutiae which correspond to $M_3$ stored in the association maps 8, the minutia $M_3'$ is identified which is closest to the coordinates of $M_{3'nom}$, and such that the difference between the length of the segments identified by the pairs of points $M_1$–$M_3$ and $M_1'$–$M_3'$ and the difference between the segments identified by the pairs of points $M_2$–$M_3$ and $M_2'$–$M_3'$ is no greater in absolute value than a predetermined threshold value (for example 6 pixels or 10% of the average length of the two segments), block 91. If the point $M_3'$ which satisfies the above conditions is not identified, output NO from block 92 applies, the minutia $M_3$ previously determined is rejected, and is marked as already considered, block 94, and it is verified whether there are other minutiae in the association maps 8, which have not yet been considered; if this is the case (YES output from block 95), a new minutia $M_3$ is taken into consideration, and there is a return to block 88, otherwise (NO output), a new point $M_1'$ is sought, and there is a return to block 82.

Otherwise, if point $M_3$ is considered acceptable (YES output from block 92), the pair formed by the point $M_3$ and the respective correlated point $M_3'$ is validated, block 97, and the comparison step is continued on the other actual minutiae which have not yet been considered, similarly to the process carried out for $M_3$. In particular, with reference to FIG. 8b, it is initially verified whether there are other actual minutiae which have not been taken into consideration, block 100. If this is the case, from the association maps 8 the minutia $M_n$ is extracted which is closest from among the actual minutiae which have not yet been considered, to a pair of minutiae $M_a$, $M_b$ which belong to one side of the triangular structure already identified. In particular, the minutia $M_n$ is sought, which from among all the actual minutiae minimises the function MAX $[L(M_aM_n), L(M_bM_n)]$, in which MAX[] and L() have the significance already explained, block 101.

Subsequently, similarly to the process described for block 89, there is identification of the rotation-translation which transforms the pair of points $M_a$–$M_b$ of the primary image into the pair $M_a'$–$M_b'$ of the secondary image, block 102. Similarly to the case for block 90, the theoretical coordinate of the minutia is calculated which corresponds to $M_n$ (estimate of $M_{n'nom}$ block 103), and, similarly to the case for block 91, from among the actual minutiae corresponding to $M_n'$ stored in the association maps 8, the point $M_n'$ block 104 is sought. If a point $M_n'$ is not identified, the NO output from block 105 applies, the point $M_n$ previously determined is rejected and is marked as already considered, block 106, and it is verified whether other actual minutiae exist, with return to block 100. If this is the case (YES output from block 105), the minutiae $M_n$ and the corresponding correlated point $M_n'$ are validated, block 107, and there is a return to block 100.

On completion of the evaluation of the actual minutiae of the primary image (NO output from block 100), the validated minutiae are counted, block 110, and it is verified whether the result of this counting is greater than a threshold required in order to validate the correspondences. If this is the case (YES output from block 111), the step of triangular comparison 21 ends; otherwise (NO output), it is verified whether there is a new initial pair of actual minutiae $M_1$, $M_2$, block 112. If the outcome of the verification is positive (YES output) there is a return to block 77, and the step of triangular comparison is carried out once more on the basis of the new initial pair of minutiae, and otherwise (NO output) there is a return to block 82.

The step of validation/identification 22 is now described for final validation of the minutiae. This step can be carried out according to one of the two alternative algorithms shown in FIG. 9 or in FIG. 10.

Figure 9:
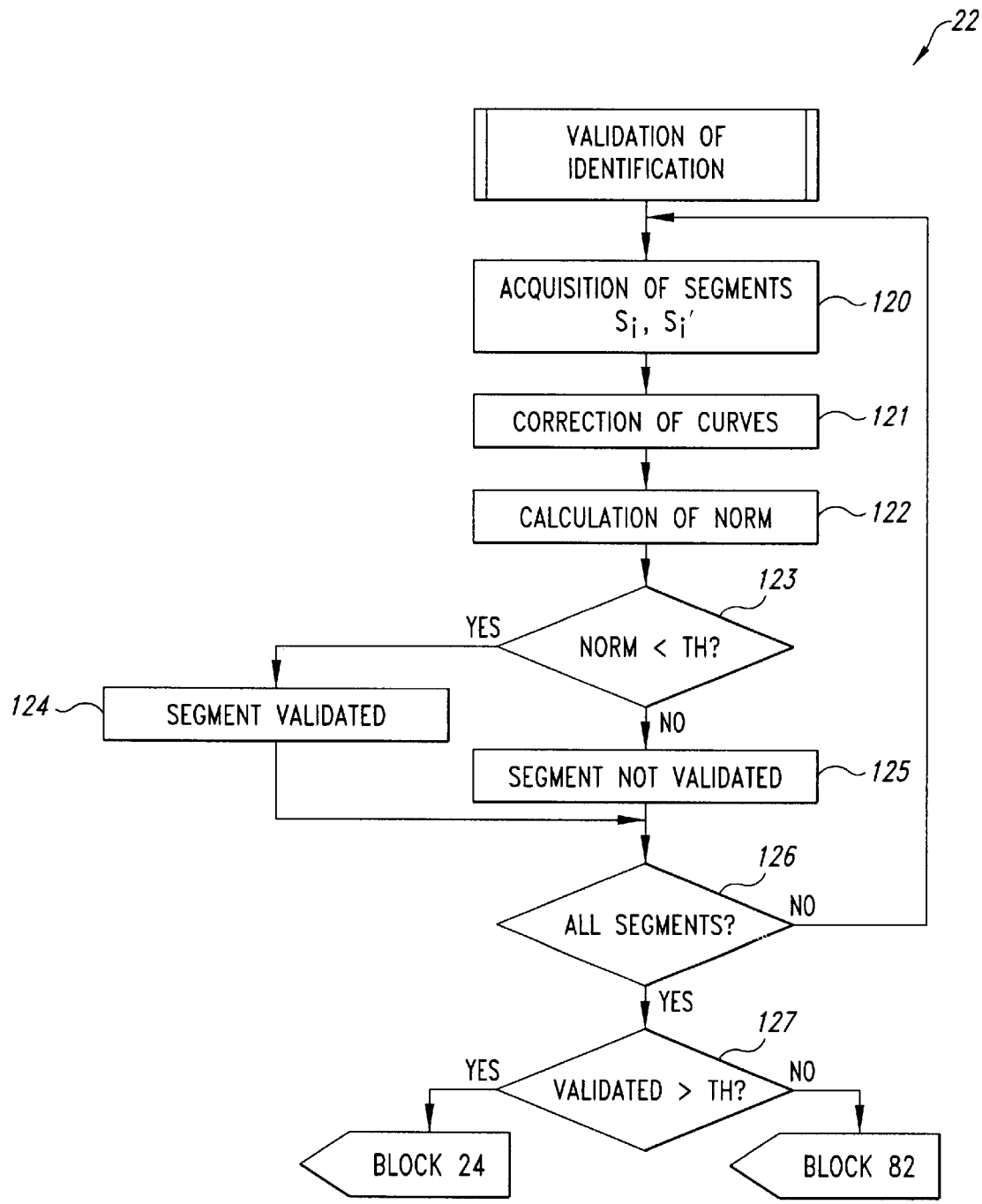

With reference to FIG. 9, according to a first alternative, initially the values are acquired of the pixels of two segments $S_i$ and $S_i'$ which join two minutiae on the primary image, and the respective minutiae associated with them on the secondary image, block 120. In particular, as far as the segment $S_i$ is concerned, this is acquired from among the segments stored in the images memory 3, on completion of the learning step.

Subsequently, there is carried out a step of identification and correction of the divergence, which is irregular in the fingerprint images. In particular, this step is carried out taking into account the fact that from among the developments of the tones of grey on two associated segments on the primary image and the secondary image, considerable divergence exists, such that when the integral norm between the two curves is calculated, the latter are found not to coincide. Furthermore, problems of alignment between curves have already been dealt with and solved in speech analysis, see for example L. Rabiner, B. H. Juang "Fundamentals of Speech Recognition," PTR Prentice-Hall, Inc. 1993, using a technique defined as "Dynamic Time Warping". On the basis of studies carried out by the inventor, this technique is also found to be useful in application to analysis of fingerprint images, taking into account the curved coordinate on the segment which joins the minutiae as the order of magnitude which corresponds to time. On completion of this step, which attempts to compensate for local deformation, and is not described in detail, block 121, two curves are obtained which are deformed compared with the original curves, in which the overlapping error has been minimized.

The two deformed curves are then compared in order to show their similarity. In particular, block 122, their integral norm is calculated as explained hereinafter; and the integral norm is compared with a predetermined threshold, block 123. If the norm is lower than the threshold (YES output from block 123), the pair of segments is validated, block 124, otherwise it is not validated, block 125. In both cases, it is verified whether all the segments have been examined which join pairs of validated minutiae, block 126. If the outcome is negative, there is a return to block 120, if the outcome is positive it is evaluated whether the total number of validated segments (or the number of minutiae from which a minimum number of validated segments starts), exceeds a predetermined threshold, block 127. If the number of validated segments exceeds the threshold (YES output from block 127) there is progress to block 24; otherwise there is progress to block 82.

Figure 10A:
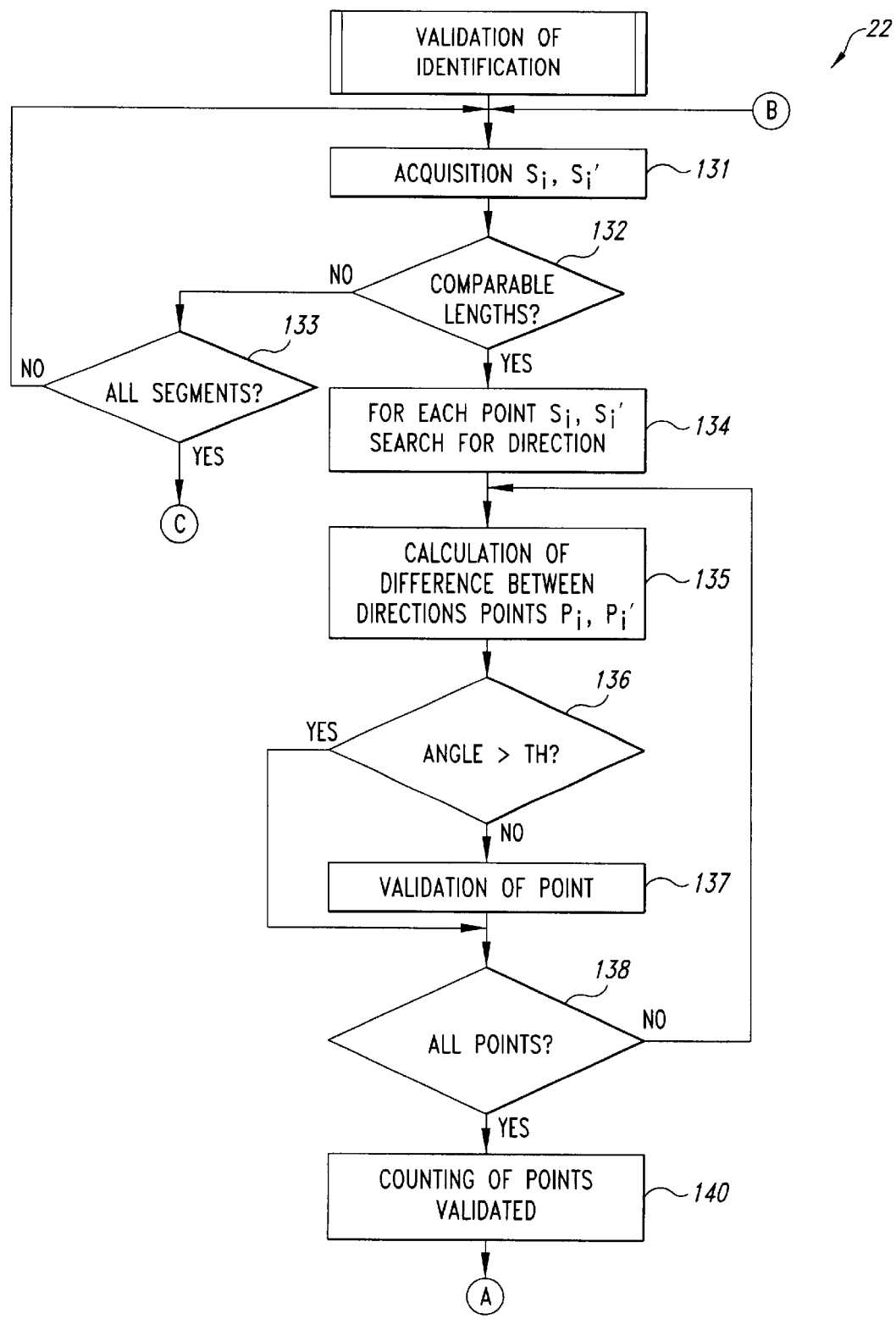
Figure 10B:
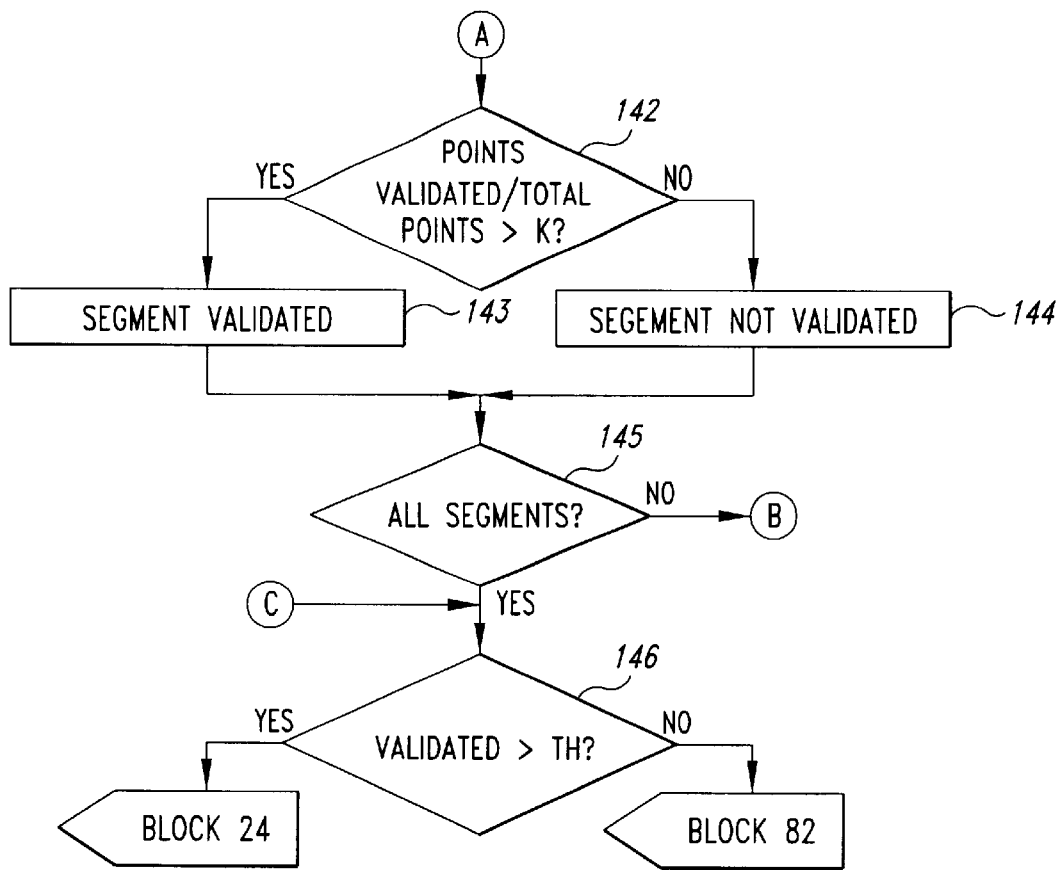

According to the alternative procedure shown in FIG. 10, the validation is carried out through an algorithm which is indicated hereinafter as "validation via the directional field". As shown in FIG. 10, initially there are again identified the segments $S_i$ and $S_i'$ which join two validated minutiae of the primary image, and the corresponding associated minutiae on the secondary image, block 131. It is then verified that the length of the two segments are comparable, block 132. If this is not the case (NO output), it is verified whether all the segments which join all the pairs of validated minutiae have been examined, block 133. If this is not the case (NO output), a new segment is acquired, and there is return to block 131, otherwise it is verified whether the number of validated segments is greater than a predetermined threshold according to block 146, as described in greater detail hereinafter. If the lengths of the segments examined are comparable, YES output from block 132 applies, for each point of the segments $S_i$ and $S_i'$ there is extracted data associated with the direction of the crests which intersect the segment or are close to the segment, block 134. For example, the direction is sought (quantified according to eight directions) of maximum variation of the tones of grey of the pixels. For this purpose use can be made of the algorithm described in D. C. Douglas Hung, "Enhancement and feature purification of Fingerprint Images," Pattern Recognition, Vol. 26, pp. 1661–1671 (1993). Then the relative direction from amongst the direction of the segment and the direction of the crests is calculated.

When the field of directions along each segment is known, the angle is calculated between the relative directions of the crests in two corresponding points in the primary image and in the reference image, block 135. If this angle is smaller than a predetermined threshold (for example ±22°, NO output from block 136), the directions are considered to coincide, and the point is validated (block 137). Subsequently, as in the case of non-validation of the points (YES output from block 136), it is verified that all the points of the segments have been compared, block 138. Otherwise there is a return to block 135. If the outcome is positive, then the validated points are counted in block 140. It is then verified that the ratio between the number of validated points and the total number of points of the segments is greater than a predetermined threshold, for example 0.4, block 142. If the outcome is positive the segment is validated, block 143; otherwise the segment is not validated, block 144. It is then checked whether all the segments have been examined which join pairs of validated minutiae, block 145. If the outcome is positive it is verified whether the number of segments validated is greater than a predetermined threshold, block 146. Otherwise there is a return to block 131. In particular, this check can be carried out by requiring that the number of validated segments for each validated minutia must be greater than a predetermined threshold (for example 4), or the total number of validated segments is greater than a predetermined threshold. If the outcome of the comparison is positive, YES output from block 146, the print is considered recognised, and there is progress to block 24 of FIG. 2b; otherwise the print is not considered recognised and there is passage to block 82 of FIG. 8a.

For both the solutions (comparison after processing of dynamic time warping, or of evaluation of the directional field), the step of identification/validation can be incorporated directly in the step of triangular comparison, instead of being carried out on completion of the comparison, as described above. In this case, in the flow chart in FIGS. 8a and 8b, in all the steps in which it is verified that the difference in length of the segments between the primary image and the secondary image is within a specific field of tolerance (for example in the check for acceptance of the points of the secondary image to be associated with the minutiae of the primary image, steps 81, 92 and 105), it is possible to introduce the test of validation of the correspondence of the pair of segments, as well as simply checking the length. This inclusion during the triangular check is appropriate if the check is carried out with sufficient efficiency, and thus requires little time. In this case, the advantage is obtained that only the minutiae are accepted which can also pass the final check, thus reducing significantly the number of spurious minutiae in the triangular structures.

Hereinafter there is described the algorithm of comparison and determination of the minimum distance between a region of the secondary image which surrounds a point $P_j$ of coordinates $(X_j, Y_j)$, and all the pre-rotated images associated with all the validated minutiae $P_i$ of coordinates $(X_i, Y_i)$, using the integral norm, in accordance with step 58 of FIG. 6.

The object is to calculate the integral norm between two surfaces $Si_p$ and $Sj_s$ defined as:

$$Si_p = \{x,y,z\} : z = \text{grey}(x,y)$$

with $$Xi-8 \leq x < Xi+8;\ Yi-8 \leq y < Yi+8$$

for the points of the primary image, and $$Sj_s = \{x,y,z\} : z = \text{grey}(x,y)$$

with $$Xj-8 \leq x < Xj+8;\ Yj-8 \leq y < Yj+8$$

for the points of the secondary image, in which grey(x,y) is the shade of grey of the image (secondary or primary) in the point (x,y).

The integral norm N between the two surfaces $Si_p$ and $Sj_s$ is provided by $$N = \iint_{M \times M} Sj_s(x,y) - Si_p(x,y) \cdot dx dy \quad (1)$$

Since, in the case in question, the region MxM (16×16) and the functions $Si_p$, $Sj_s$ for calculation of the similarity are discrete, the double integral is transformed into a double summation, and the equation (1) becomes $$N = \Sigma\Sigma \cdot Sj_s(x-Xi+Xj, y-Yi+Yj) - Si_p(x,y) \cdot \quad (2)$$

with $$Xi-8 \leq x < Xi+8;\ Yi-8 \leq y < Yi+8.$$

Calculation of the norm thus defined is very onerous in the application considered, for which it is necessary to carry out seven comparisons for each actual minutia determined and for each pixel of the secondary image (therefore 7×70×512 ×512 comparisons). In order to solve this problem, according to an aspect of the invention, calculation of the above-described norm is carried out in parallel using an analog flash cell. array. In fact, as described in detail in the article by A. Kramer, M. Sabatini, R. Canegallo, M. Chinosi, P. L. Rolandi and P. Zabberoni "Flash-Based Programmable Non-linear Capacitor for Switched-Capacitor Implementations of Neural Networks" in IEDM Tech. Dig. pp. 17.6.1–17.6.4, December 1994, flash cells can be used to calculate the absolute value of the difference between two values, by connecting the source and drain regions of two flash cells to one another and to an input node of a load integrator, supplying to the gate terminal of a first cell the voltage corresponding to the first value, storing in the first cell as a threshold voltage the second value to be subtracted from the first, supplying to the gate terminal of the second cell a voltage in addition to that supplied to the first cell, and storing in the second cell as a threshold voltage a value in addition to the second value to be subtracted (see in particular FIG. 3 of the aforementioned article). As indicated in the same article, it is also possible to calculate the sum of the difference between pairs of values, by connecting to one another the output nodes of different pairs of cells, of which there are provided (as threshold voltage and input voltage) the pairs of values to be summed (see FIG. 4 relating to calculation of the Manhattan distance between two vectors).

Using this principle, it is possible to carry out in parallel calculation of the norms, as defined above, between a region which surrounds a pixel of the secondary image and all the pre-rotated regions associated with a validated minutia. By supplying the value of these norms to a device for calculation of the minimum, it is thus possible to determine, from amongst all the pre-rotated images stored, the distance between the pre-rotated image which is the most similar to the region which surrounds the pixel examined, and this region. In addition by repeating the above-described structure of calculation of the minimum distance for all the actual minutiae identified, it is possible to compare simultaneously the pixel examined of the secondary image, with all the actual minutiae, in order to obtain the minimum distance of all the minutiae.

An example of a unit which can be used for calculation in parallel of the norm as described above, and based on the architecture shown in FIG. 4 of the aforementioned article by Kramer et al, is given in FIG. 11, and is now described in detail hereinafter.

Figure 11:
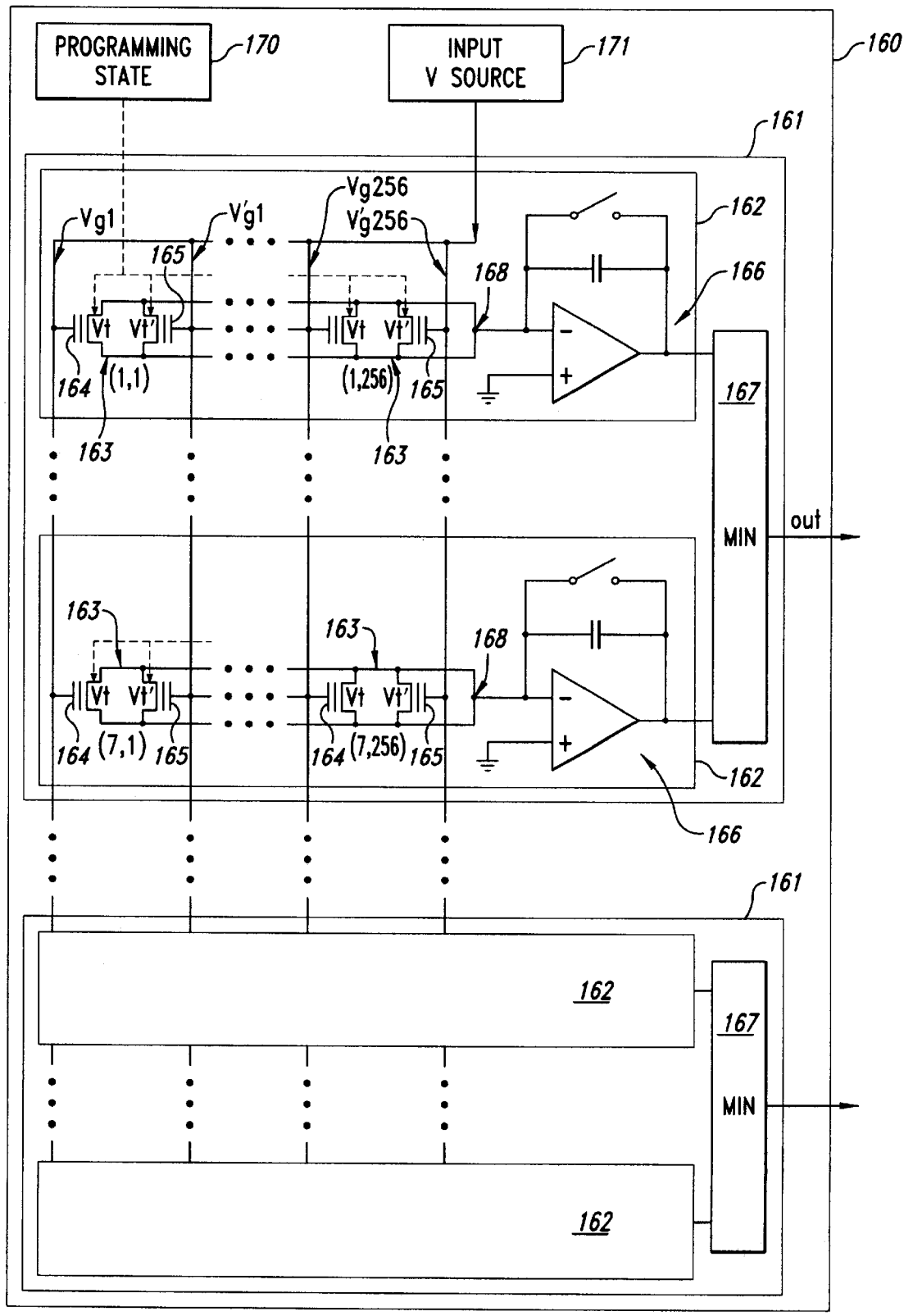
FIG. 11 shows a circuit diagram of a unit according to the device in FIG. 1.

In FIG. 11, the unit for calculation in parallel 160 comprises 70 blocks 161 (equal to the number of actual minutiae stored), each consisting of 7 sub-blocks 162 (equal to the number of pre-rotated regions associated with each actual minutia) consisting of 256 pairs of cells 163 (equal to the number of pixels of a region which surrounds the pixel $P_j$ of the secondary image examined). Each pair of cells 163 comprises a first cell 164 and a second cell 165; the drain and source terminals of the cells 164, 165 of each sub-block 162 are connected together and to a node 168. Each sub-block 162 also comprises a load amplifier 166, the inverting input of which is connected to the node 168 of the respective sub-block 162, and the load amplifiers 166 of each block 161 are connected to a unit for determination of the minimum 167, which supplies the value of the minimum distance directly as output. The unit for calculation in parallel 160 also comprises a programming stage 170 which is connected to the pairs of cells 163, and is produced in a known manner (e.g., as described in European Patent Application EP-A-0 621 603 entitled "Method and circuit for tunnel effect programming of floating gate MOSFET transistors" in the name of the applicant) and a voltage generator 171 connected to the gate terminals of all the cells, 164, 165. In addition, the stage 170 and the generator 171 are connected to the cells 164, 165 by selection and addressing means not shown.

Figure 12:
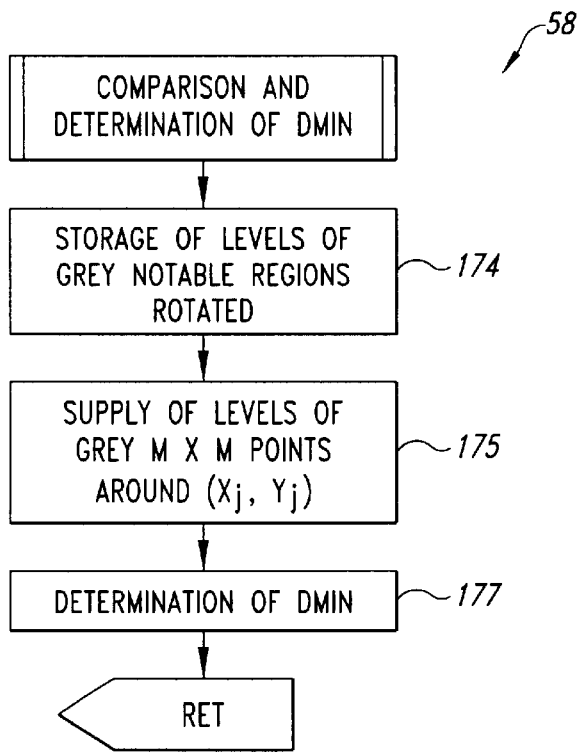
FIG. 12 shows a flow chart relating to a step of the present method.

Then, with reference also to FIG. 12, at the end of the definition step, in each sub-block 162, the pairs of cells 163 are programmed with voltages Vt, Vt' correlated with the levels. of grey of a respective pixel of the respective pre-rotated region, block 174, and. the cells of the pairs are programmed with complementary voltages according to the ratio indicated in FIG. 3 of the aforementioned article. The sub-blocks 162 of each block 161 are associated with a different pre-rotated region of a single effective minutia of the primary image, and the blocks 161 are associated with the different actual minutiae. During the recognition step, the voltage generator 174 supplies to each pair of cells 163 reading voltages Vg, Vg' which are correlated with the levels of the grey of the 256 pixels which belong to the region which surrounds the point $P_j$ examined in each case in the secondary image, in a manner which is complementary for the-two cells of each pair, block 175. Thereby, each sub-block 162 calculates the integral norm between the associated pre-rotated region and the pixel $P_j$, block 175, and the units 167 determine its minimum value, supplied in parallel as an output for all the actual minutiae, block 177.

Figure 13:
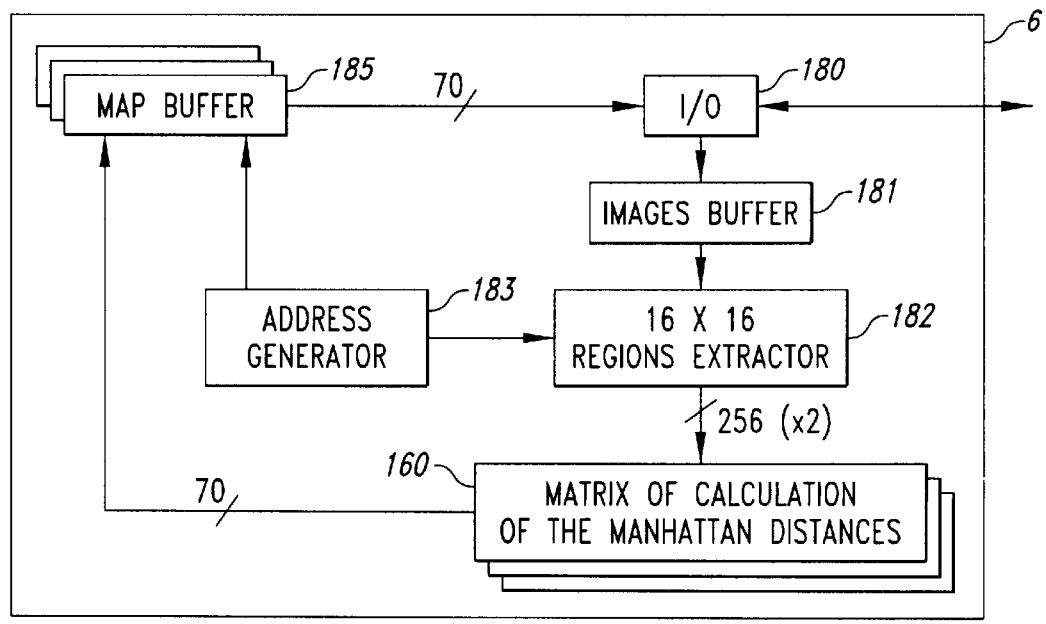
FIG. 13 shows a simplified flow chart of a detail of the device in FIG. 1, and which incorporates the unit in FIG. 11.

FIG. 13 shows the general architecture of a unit for extraction of the correspondence maps. In detail, an I/O device 180 receives the roughly filtered secondary image from the image memory 3 and supplies it to an image buffer 181. The latter is connected to a region extractor 182, which in each case, on the instructions of an address generator 183, extracts 16×16 pixels, equal to 256 values, which are supplied in parallel to the calculation unit 160. A map buffer 185 receives from the unit 160 the value of the minimum norms for each actual minutia calculated as described above, and supplies these norms to the I/O unit 180, which transmits them to the processing unit 4, for further processing.

Calculation of the similarity of segments planned in step 122 in FIG. 9 is similarly based on calculation of the integral norm, defined here by a straight integral, and no longer as a double integral. In view of the presence of discrete points, calculation of the integral norm is reduced to calculation of a single sum, which can still be carried out through flash cells, but in this case using only a number of pairs of cells of the unit 160 which is equal to the number of points on the segments to be compared. For this purpose, the length of the segments of the primary image and the secondary image are normalised, in order to be able to compare the segments directly. The levels of grey of the points of the segment of the primary image are stored as programming voltages of the pairs of cells 163, and to the inputs of these pairs of cells 163 there are supplied voltages which are proportional to the levels of grey of the points of the segment of the secondary image. The value of the integral norm is then read, and this value is normalized so that it can be compared with the threshold defined in step 123.

The method described has at least the following advantages. Firstly, it makes it possible to obtain a level of correct recognitions which is much greater than that which can be obtained with the previous devices, whilst maintaining a high level of reliability. Secondly, the calculation time is compatible with the applications planned, owing to the use of dedicated hardware units and to execution of many of the operations which are onerous from the point of view of calculation, during the preliminary processing. Thirdly, practical implementation can easily be adapted to individual requirements, for example to meet requirements in a security environment for civil use.

Finally, it is apparent that changes and variants can be made to the method described and illustrated here, without departing from the protective scope of the present invention, as defined in the attached claims. In particular, it is emphasised that the above-described operations can be optimised in various ways. The actual form of the flash cell array for calculation of the integral norm can also differ from the embodiment shown. The integral norm can also be calculated by programming and reading the flash cells in a manner different from that described, i.e., by programming the flash cells with the levels of grey of the secondary image, and supplying to the gate terminals voltages which are proportional to the levels of grey of the primary image. Finally, the final validation can be carried out as the last operation or during the triangular comparison, as described above, optionally using algorithms which are different from the two described above.

What is claimed is:

1. A method for identifying fingerprints, comprising the steps of:
    acquiring a primary image having a plurality of primary points, and a secondary image having a plurality of secondary points, said primary and secondary points being characterised by a quantity associated with the three-dimensional structure of prints to be identified;
    determining notable points among said plurality of primary points;
    programming flash memory cells to compare said primary image and secondary image;
    comparing said primary image and secondary image;
    identifying possible correspondences between said primary image and said secondary image; and
    validating said possible correspondences;
    wherein said comparison step comprises the steps of:
        determining scanning regions of said secondary image, which surround said secondary points, and comprise said entire secondary image; and
        comparing notable regions of said primary image which surround said notable points, with said scanning regions, using the flash memory cells.

2. A method according to claim 1 wherein the step of comparing notable regions comprises the steps of:
    determining a level of similarity between each notable region and each scanning region; and
    generating a correspondence map by storing said levels of similarity, and the step of identifying possible correspondences comprises the steps of:
        on the basis of said correspondence maps, associating with each notable point of a plurality of associated points which belong to scanning regions and have a level of similarity which satisfies a predetermined condition; and
        generating at least one association map which stores an association between each notable point and said plurality of associated points.

3. A method according to claim 2 wherein the associating step comprises the step of ordering the associated points based on the level of similarity, and determining a predetermined number of associated points which have a minimum level of similarity.

4. A method according to claim 2 wherein the step of determining a level of similarity comprises the step of determining of the integral norm among said notable regions and said scanning regions.

5. A method according to claim 1 wherein before the step of comparing notable regions, the following steps are carried out:
    acquiring said notable regions;
    rotating each notable region acquired, thereby obtaining a plurality of pre-rotated regions associated with each notable point; and
    storing said pre-rotated regions;
    and wherein the step of comparing notable regions comprises the steps of:
        determining a level of similarity between a scanning region and each of said pre-rotated regions associated with one of said notable points;
        determining a pre-rotated region at a minimum distance, from among said plurality of pre-rotated regions associated with one of said notable points, having a maximum level of similarity with said one scanning region;
        establishing correspondence between the pre-rotated region at a minimum distance and said one scanning region.

6. A method according to claim 5 wherein the steps of determining a level of similarity, determining a pre-rotated region at a minimum distance, and determining a correspondence are carried out in parallel for all of said notable points.

7. A method according to claim 1 wherein, before the step of determining notable points, there is carried out a step of fine filtering using a non-linear filter in the Fourier two-dimensional transformation domain, thereby obtaining a finely filtered image, and wherein said step of determining notable points is carried out on said finely filtered image.

8. A method according to claim 7 wherein, before the step of comparing said primary image and secondary image, there are carried out the steps of rough filtering of the primary image and secondary image, thereby obtaining roughly filtered primary and secondary images, and wherein the step of comparing said primary image and said secondary image is carried out on said roughly filtered primary and secondary images.

9. A method for identifying fingerprints, comprising the steps of:
    acquiring a primary image having a plurality of primary points, and a secondary image having a plurality of secondary points, said primary and secondary points being characterised by a quantity associated with the three-dimensional structure of prints to be identified;
    determining notable points among said plurality of primary points;
    comparing said primary image and secondary image;
    identifying possible correspondences between said primary image and said secondary image; and
    validating said possible correspondences;
    wherein said comparison step comprises the steps of:
        determining scanning regions of said secondary image, which surround said secondary points, and comprise said entire secondary image; and
        comparing notable regions of said primary image which surround said notable points, with said scanning regions, using flash memory cells
    wherein the step of comparing notable regions comprises the steps of:
        determining a level of similarity between each notable region and each scanning region by determining the integral norm among said notable regions and said scanning regions; and generating a correspondence map by storing said levels of similarity, and the step of identifying possible correspondences comprises the steps of:

on the basis of said correspondence maps, associating with each notable point of a plurality of associated points which belong to scanning regions and have a level of similarity which satisfies a predetermined condition; and generating at least one association map which stores an association between each notable point and said plurality of associated points;

wherein the step of determining said integral norm comprises the steps of:

programming flash cells with a threshold value which is correlated with a value of a quantity of points selectively belonging to said notable and scanning regions;

biasing said flash cells with a voltage value which is correlated with the value of the quantity of points selectively belonging to another of said notable and scanning regions; and measuring the charges flowing through said flash cells.

10. A method for identifying fingerprints, comprising the steps of:

acquiring a primary image having a plurality of primary points, and a secondary image having a plurality of secondary points, said primary and secondary points being characterised by a quantity associated with the three-dimensional structure of prints to be identified;

determining notable points among said plurality of primary points;

comparing said primary image and secondary image;

identifying possible correspondences between said primary image and said secondary image; and validating said possible correspondences;

wherein said comparison step comprises the steps of:

determining regions of said secondary image, which surround said secondary points, and comprise said entire secondary image; and comparing notable regions of said primary image which surround said notable points, with said scanning regions, using flash memory cells;

wherein, before the step of determining notable points, there is carried out a step of fine filtering using a non-linear filter in the Fourier two-dimensional transformation domain, thereby obtaining a finely filtered image, and wherein said step of determining notable points is carried out on said finely filtered image;

wherein, before the step of comparing said primary image and secondary image, there are carried out the steps of rough filtering of the primary image and secondary image, thereby obtaining roughly filtered primary and secondary images, and wherein the step of comparing said primary image and said secondary image is carried out on said roughly filtered primary and secondary images;

wherein the step of rough filtering comprises the steps of:

filtering said primary image based on values of adjacent points, thereby obtaining a filtered first image;

dividing said first, filtered primary image into a plurality of first filtered regions;

determining minimum, mean, and maximum values in each first filtered region;

filtering each first filtered region based on values of adjacent points, thereby obtaining a plurality of second filtered regions;

dynamically filtering each second region filtered based on the minimum, mean and maximum values, thereby obtaining a plurality of third filtered regions, which together form roughly filtered primary and secondary images.

11. A method for identifying fingerprints, comprising the steps of:

acquiring a primary image having a plurality of primary points, and a secondary image having a plurality of secondary points, said primary and secondary points being characterised by a quantity associated with the three-dimensional structure of prints to be identified;

determining notable points among said plurality of primary points;

comparing said primary image and secondary image;

identifying possible correspondences between said primary image and said secondary image; and validating said possible correspondences;

wherein said comparison step comprises the steps of:

determining scanning regions of said secondary image, which surround said secondary points, and comprise said entire secondary image; and comparing notable regions of said primary image which surround said notable points, with said scanning regions, using flash memory cells;

wherein after the step of comparing notable regions, and before the step of validating the possible correspondences, the steps are carried out of:

determining, for each notable point of said primary image, a plurality of correlated points which belong to said secondary image and have a predetermined relationship with a specific notable point; and comparing each notable point of said primary image with said correlated points, forming pairs of successive triangles on said primary and secondary images, said triangles on said primary image having vertices at said notable points, and said triangles on said secondary image having vertices at said correlated points;

wherein the step of validating the possible correspondences comprises the step of validating successive pairs of points which comprise a notable point and a corresponding correlated point, based on local deformations between said pairs of triangles.

12. A method according to claim 11 wherein the steps of comparing each notable point, and validating successive pairs comprise the steps of:

a) determining from amongst said plurality of notable points a first notable point and a second notable point which are adjacent to one another on said primary image;

b) selecting a first correlated point from among said points correlated with said first notable point;

c) selecting a second correlated point from among said points correlated with said second notable point, such that the difference between the lengths of segments which join said first and second notable point and said first and second correlated point are lower than a first predetermined threshold;

d) validating said first and second notable point and said first and second correlated point;

e) determining, from among said plurality of notable points, a third notable point at a minimum distance from said first and second notable point;

f) determining a first rotation-translation which correlates said first and second notable point and said first and second correlated point;

g) determining based on said first rotation-translation and from among points correlated with said third notable point, a third correlated point;

h) validating said third notable point and said third correlated point;

i) determining, from among said plurality of notable points, a further notable point at a minimum distance from a pair of the validated notable points;

j) determining a further rotation-translation which correlates the pair of notable points validated with the respective correlated points validated;

k) determining, based on the further rotation-translation and from among points which are correlated with the further notable points, a further correlated point;

l) validating said further notable point and said further correlated point;

m) repeating steps i)–l) for all the notable points.

13. A method according to claim 12 wherein the step g) comprises the steps of:

calculating a first difference between the lengths of segments which join said first and third notable point and respectively said first and third correlated point;

calculating a second difference between the lengths of segments which join said second and third notable points and respectively said second and third correlated point; and verifying that said first and second difference is lower than said first predetermined threshold, and wherein the step k) comprises the steps of:

calculating a third difference between the lengths of segments which join said further notable point to one of the pair of validated notable points and respectively the last correlated point to one of the pair of validated correlated points;

calculating a fourth difference between the lengths of segments which join said further notable point to another of the pair of validated notable points and respectively the last correlated point to another of the pair of validated correlated points; and verifying that said third and fourth differences are lower than said first predetermined threshold.

14. A method according to claim 13, further comprising counting the number of validated notable points;

comparing the number of validated notable points with a second predetermined threshold; and generating a signal of validation of correspondences, if said second threshold is exceeded.

15. A method according to claim 11 wherein a final validation step is carried out by comparing values of points disposed on segments which join pairs of validated points.

16. A method according to claim 15 wherein said final validation step comprises the steps of processing tones of grey of the segments according to a Dynamic Time-Warping algorithm; and calculating the integral norm among said segments processed.

17. A method according to claim 15 wherein said final validation step comprises determining a first directional field associated with said segments on said primary image, and a second directional field associated with said segments on said secondary image; and comparing said first and second directional field.

18. A method according to claim 17 wherein said step of determining first and second directional fields comprises the step of determining, for each point of the segments, an angle of intersection between the direction of said segments and the direction of crests of said prints.

19. A device for identification of fingerprints, comprising:

a sensor for acquisition of a primary image having a plurality of primary points and a secondary image having a plurality of secondary points, said primary and secondary points being characterised by a quantity which is associated with the three-dimensional structure of prints to be identified;

notable point detecting means for determining notable points from among said plurality of primary points;

a comparator that compares said primary and secondary images;

a correspondence detector that identifies possible correspondences between said primary image and said secondary image; and validation means for validating possible correspondences;

wherein said comparator includes extraction means for extracting scanning regions of said secondary image which surround said secondary points; and a flash memory unit structured to receive values of said quantity of said primary points which belong to notable regions surrounding said notable points, and values of said quantity of said secondary points which belong to said scanning regions; and compare said notable points with the entire secondary image; and generate at least one output signal correlated with the difference between said notable regions and said scanning regions.

20. A device according to claim 19 wherein said flash memory unit comprises:

a plurality of pairs of flash cells connected to one another;

measure means for measuring the charge flowing through said flash cells;

a programming stage for programming of each pair of flash cells with a first threshold value correlated with the value of said quantity at points which belong selectively to one of said notable and scanning regions; and a voltage generator structured to supply to gate terminals of each pair of flash cells, a voltage which is correlated with the value of said quantity at respective points which belong selectively to the other of said notable and scanning regions.

21. A device according to claim 19 wherein said flash memory unit comprises:

a plurality of norm determination blocks each of which is associated with a corresponding notable region, each norm determination block including a plurality of norm determination sub-blocks each associated with a region which is rotated relative to said respective notable region; and a plurality of minimum determination devices, each of which is connected to a respective plurality of norm determination sub-blocks.

22. A method for identifying fingerprints, comprising:

acquiring a subject image of a fingerprint to be identified, the subject image having a plurality of secondary points;

determining scanning regions surrounding the secondary points;

determining notable regions surrounding notable points of a reference image;

rotating each notable region, thereby obtaining a plurality of pre-rotated regions corresponding to each notable region;

storing the pre-rotated regions; and programming flash memory cells to compare the subject image with the reference image;

comparing the subject image with the reference image using the programmed flash memory cells, the comparing step including comparing each scanning region with one of the notable regions of the subject image and with the pre-rotated regions corresponding with the one notable region.

23. The method of claim 22, further comprising validating possible correspondences between notable points of the reference image and secondary points of the subject image by:

comparing values of points disposed on segments joining pairs of notable points with values of points disposed on segments joining pairs of secondary points;

determining a first directional field associated with the segments of the reference image, and a second directional field associated with the segments on said subject image; and comparing the first and second directional fields.

24. A method for identifying fingerprints, comprising:

acquiring a subject image of a fingerprint to be identified, the subject image having a plurality of secondary points;

determining scanning regions surrounding the secondary points;

determining notable regions surrounding notable points of a reference image;

rotating each notable region, thereby obtaining a plurality of pre-rotated regions corresponding to each notable region;

storing the pre-rotated regions; and comparing the subject image with the reference image, the comparing step including comparing each scanning region with one of the notable regions of the subject image and with the pre-rotated regions corresponding with the one notable region, wherein the comparing step includes determination an integral norm among the notable regions and the scanning regions by steps that include:

programming flash memory cells with a threshold value correlated with a value of a quantity of points selectively belonging to a corresponding pair of the notable and scanning regions;

biasing the flash memory cells with a voltage value correlated with a value of a quantity of points selectively belonging to another pair of the notable and scanning regions; and measuring charges flowing through said flash memory cells.

25. A method for identifying fingerprints, comprising:

acquiring a subject image of a fingerprint to be identified, the subject image having a plurality of secondary points;

determining scanning regions surrounding the secondary points;

determining notable regions surrounding notable points of a reference image;

rotating each notable region, thereby obtaining a plurality of pre-rotated regions corresponding to each notable region;

storing the pre-rotated regions;

comparing the subject image with the reference image, the comparing step including comparing each scanning region with one of the notable regions of the subject image and with the pre-rotated regions corresponding with the one notable region;

determining, for each of the notable points of the reference image, of a plurality of correlated points of the subject image, which have a predetermined relationship with the notable point;

comparing each notable point of the reference image with the correlated points by forming pairs of successive triangles on the reference and subject images, the triangles on the reference image having vertices at the notable points, and the triangles on said subject image having vertices at the correlated points; and validating successive pairs of notable points and corresponding correlated points based on local deformations between the pairs of triangles.

* * * * *